(12) United States Patent
Peeters et al.

(10) Patent No.: US 6,201,633 B1
(45) Date of Patent: Mar. 13, 2001

(54) MICRO-ELECTROMECHANICAL BASED BISTABLE COLOR DISPLAY SHEETS

(75) Inventors: Eric Peeters, Fremont; Jackson Ho, Palo Alto, both of CA (US); Feixia Pan, Webster, NY (US); Raj B. Apte, Palo Alto, CA (US); Joel A. Kubby, Rochester, NY (US); Ronald T. Fulks, Mountain View, CA (US); Decai Sun, Sunnyvale, CA (US); Patrick Y. Maeda, Mountain View, CA (US); David Fork, Los Altos, CA (US); Robert Thornton, Lake Oswego, OR (US); Ross Bringans; G. A. Neville Connell, both of Cupertino, CA (US); Philip Don Floyd, Sunnyvale, CA (US); Tuan Anh Vo, Hawthorne, CA (US); Koenraad Van Schuylenbergh, Mountain View, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/326,876

(22) Filed: Jun. 7, 1999

(51) Int. Cl.[7] .................................................. G02B 26/00
(52) U.S. Cl. .......................... 359/296; 359/292; 359/316; 359/230
(58) Field of Search .................... 359/290, 291, 359/292, 296, 316, 317, 318, 227, 230, 254

(56) References Cited

U.S. PATENT DOCUMENTS

| | | |
|---|---|---|
| 4,383,255 | 5/1983 | Grandjean et al. ................. 340/764 |
| 4,564,836 | 1/1986 | Vuilleumier et al. ................ 340/783 |
| 4,584,056 | 4/1986 | Perret et al. ......................... 156/630 |
| 5,078,479 | 1/1992 | Vuilleumier ........................ 359/290 |
| 5,226,099 | 7/1993 | Mignardi et al. ..................... 285/19 |
| 5,459,602 | 10/1995 | Sampsell ............................. 359/234 |
| 5,552,925 | 9/1996 | Worley ................................ 359/230 |
| 5,579,149 | 11/1996 | Moret et al. ........................ 359/223 |
| 6,034,807 | * 3/2000 | Little et al. ......................... 359/291 |

OTHER PUBLICATIONS

E. Obermeier, J. Lin, V. Schlichting, "Design and Fabrication of an Electrostatically Driven Micro–Shutter", Microsensor Technology, Technical University of Berlin.

* cited by examiner

Primary Examiner—Huy Mai
(74) Attorney, Agent, or Firm—Fay, Sharpe, Fagan, Minnich & McKee, LLP

(57) ABSTRACT

A micro-electromechanical bistable shutter display device is provided capable of being implemented for both small screen, high resolution devices and for large billboard-type displays. The micro-electromechanical shutter assembly has bi-stability characteristics which allow the use of only a holding voltage to maintain an image. The micro-electromechanical shutter assembly includes a shutter having petal-like shutter segments covering reflective or transmittive films. To expose the film in a particular shutter assembly, its shutter segments are moved from the horizontal to a vertical position using electrostatic attraction forces to "collapse" the torsionally-hinged shutter segments. The shutter assembly can have a number of segments, as long as the resulting shutter assembly shape can be stacked to form a dense 2D array.

24 Claims, 19 Drawing Sheets

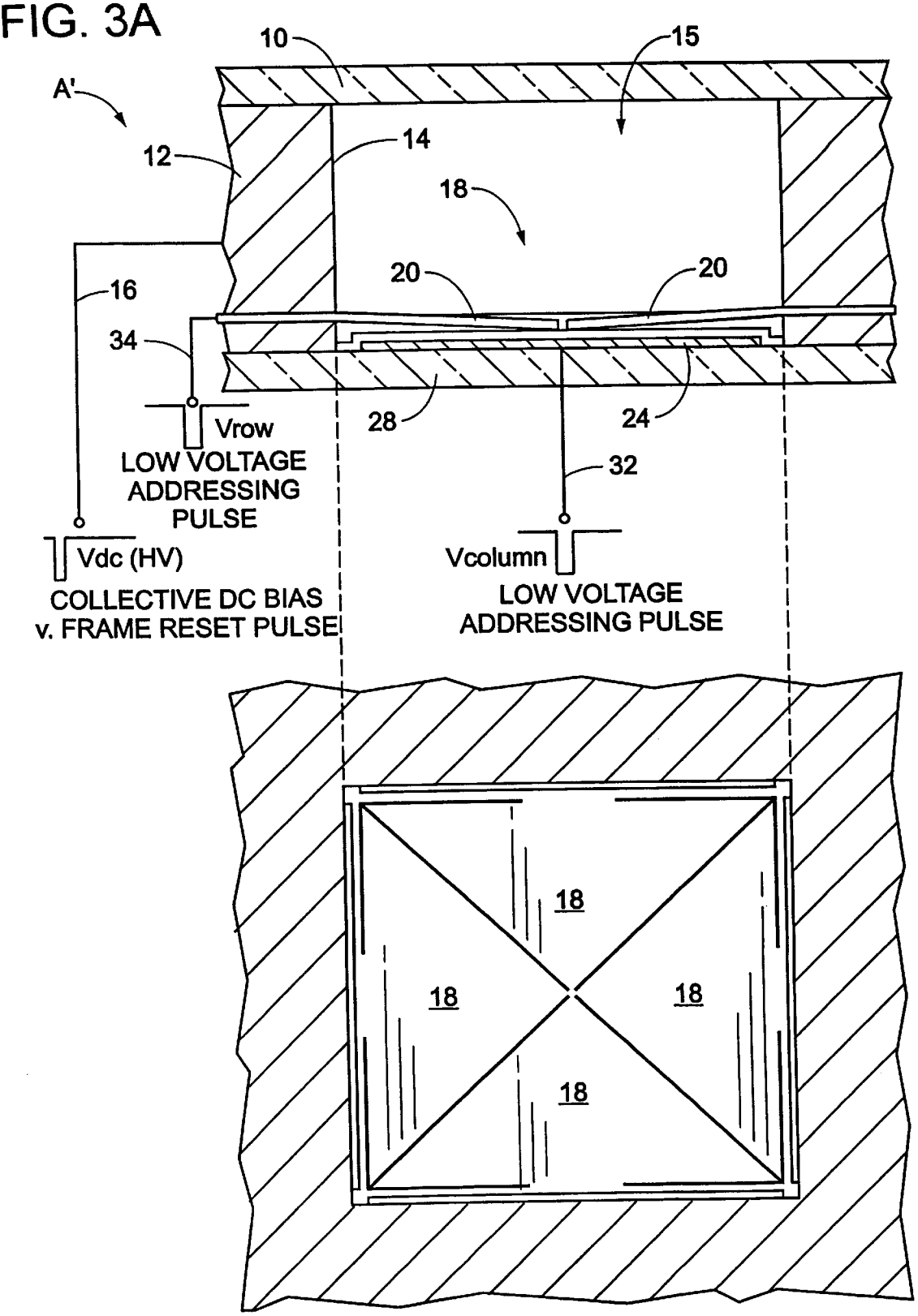

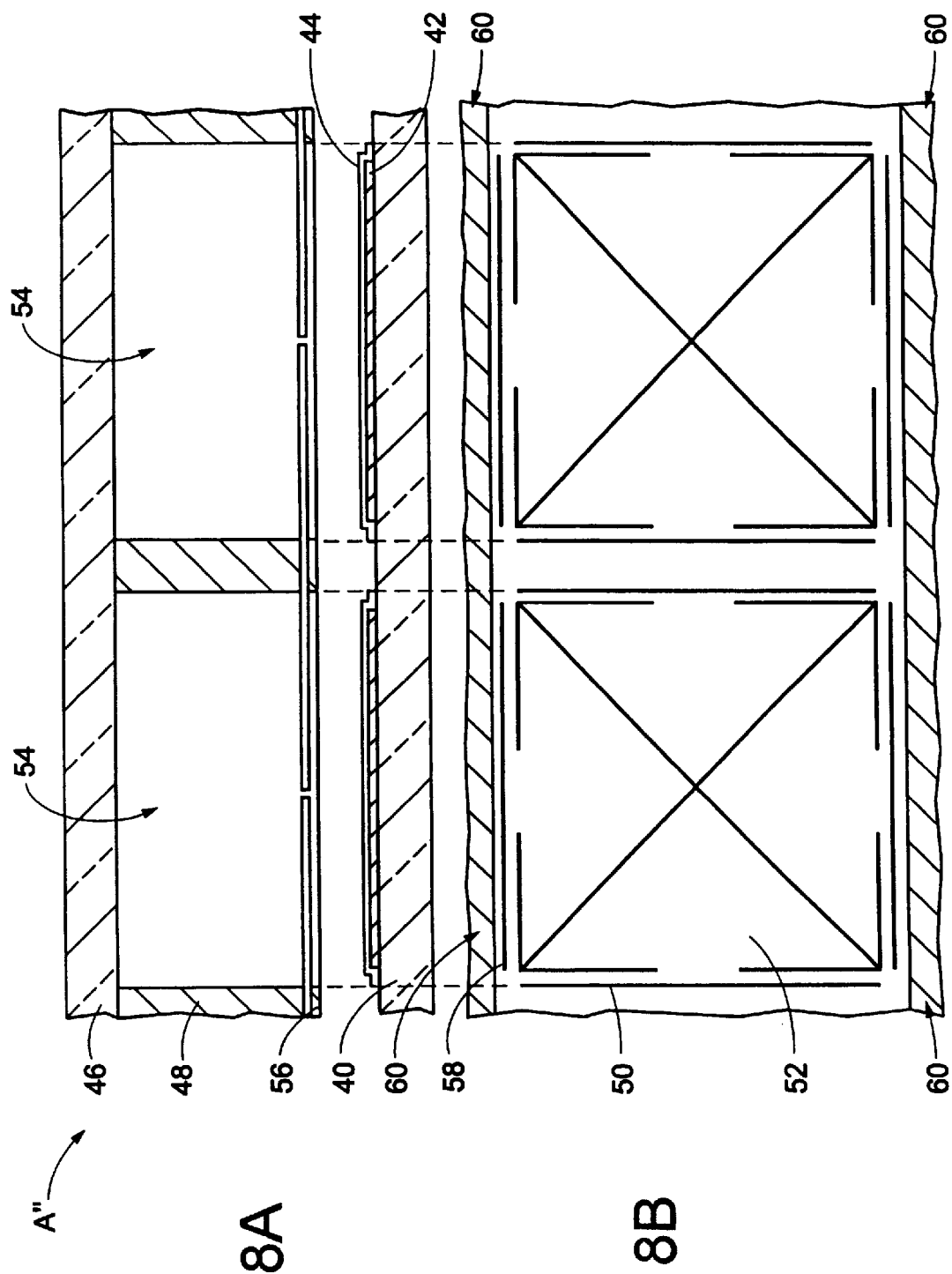

MICRO-ELECTROMECHANICAL BASED BISTABLE COLOR DISPLAY SHEETS

BACKGROUND OF THE INVENTION

The present invention is directed to reflection and projection displays and more particularly to micro-electromechanical shutter assemblies for use in such displays.

Techniques for fabricating micro-electromechanical devices have been set forth in various articles in technical journals. Additionally, patents have issued which address light modulation through the use of micro-electromechanically devised shutters. In particular, U.S. Pat. No. 5,078,479 to Vuilleumier describes a light modulation device with matrix addressing. Each cell of the matrix has two flaps fixed to a substrate by flexible attachments, by proper application of electrical charges, the flaps are activated to twist to a position allowing passage or blockage of light.

A patent to Worley, U.S. Pat. No. 5,552,925 describes a micro-electromechanical shutter array using micro-electromechanical technology and silicon-on-transparent-substrate technology. The array is operated using electrostatic forces which allow for the twisting of the shutter which is set forth as a rotor.

A laser beam modulator is described in a paper by Obermeier et al. (Univ. Berlin). A rectangular 2-segment shutter suspended from torsion rods is used to demonstrate the concept of large angle deflection of a torsionally suspended shutter under the influence of an electrostatic force between the plates of a 90°-angle capacitor. The scale of the described shutters are 1mm with 450 µm long torsion rods. The shutters are used in an analog mode, i.e. there's no address electrode, only a bias voltage. The shutters and hinges are shown as being made of polysilicon, Al and Cr/Au.

Obermeier et al. reports lifetimes in the order of $10^5$ cycles for the materials they have used (Poly, Al or Cr/Au). For these materials, the springs need to be designed in a way the stress at 90° is below the fatigue limit or elastic stress limit. These materials are likely to require longer, thinner torsion rods than single crystal silicon.

Texas Instruments is known to be working on DMD projection display technology, i.e. using a DC bias voltage to achieve bi-stability and passive matrix addressability with low voltage switching only. Differences between this work and the present invention include the large angle mode, the geometry of the devices, the application to which the devices are applied (direct view vs. projection) and the scale (TI pixels are 17 µm or so).

Other micro-electromechanical shutter devices are disclosed, for example in U.S. Pat. No. 5,226,099 to Mignardi et al.; U.S. Pat. No. 5,459,602 to Sampsell; U.S. Pat. No. 4,383,255 to Grandjean, et al.; U.S. Pat. No. 4,564,836 to Vuilleumier, et al.; U.S. Pat. No. 4,584,056 to Perret et al.; and U.S. Pat. No. 5,579,149 to Moret et al.

SUMMARY OF THE INVENTION

The present invention is therefore directed to a bistable shutter display device capable of being implemented for both small-screen high-resolution devices such as personal data communicators and large displays such as billboards. In addition, the invention is directed to a micro-electromechanical shutter assembly display which has bi-stability characteristics which allow the use of only a holding voltage to maintain an image, without the requirement of refreshing voltage or charges such as in existing electronic displays. Thus, there is substantially zero power consumption while an image is being displayed. Substantially all power consumption is therefore associated with the switching from one image to another image and not to the displaying of the captured image. The present invention may also be described as a passive matrix display and therefore the requirement of transistors and other devices which add to the cost of constructing a reflection, projection or transreflective display is not required.

In accordance with the present invention, a micro-electromechanical shutter assembly includes a shutter having petal-like shutter segments covering reflective and/or transmittive films. In a black and white display, the films reflect either white or black, and in a color display the films are pixilated color filters. The assembly may be used in reflective, transmissive and transreflective modes to expose the film in a particular shutter assembly, its shutter segments are moved from the horizontal to the vertical position using electrostatic attraction forces to 'collapse' the torsionally hinged shutter segments. The shutter assembly can have any number of segments, as long as the resulting shutter assembly shape can be stacked to form a dense 2D array. Square or rectangular 2- or 4-segment or 6-segment hexagon shutter assemblies are shapes which can be used to obtain the desired density.

When configured in the form of sheets the shutter assembly consists of a stack of 3 layers and/or films sandwiched between an insulated backplate, having an incorporated conductive electrode film, and a transparent face plate/film. The first layer is a conductive material formed to have conductive sidewalls. The second layer also is a conductive material which is patterned to form the shutter having shutter segments, and the third layer is an insulator film defining a gap between the shutter and the backplate.

The present invention has as a first object a shutter assembly which can be used with projection and reflection displays, and which is fabricated according to micro-electromechanical technologies.

According to another aspect of the present invention, the shutter assembly is constructed to have bi-stability incorporated within a mechanical configuration whereby when an image is displayed the image may be maintained simply through the use of a bias holding voltage, wherein it becomes unnecessary to refresh the image during such display.

It is another object of the present invention to provide a passive matrix which is compatible with grey scale image formation.

These together with other objects of the invention, along with the various features of novelty which characterize the invention, are pointed out with particularity in the claims attached to and forming a part of this disclosure. For a better understanding of the invention, its operating advantages and the specific objects obtained by its uses, reference should be made to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the attached drawings wherein:

FIGS. 3A, 3B depict a cross-sectional view and the related top view of a square shutter assembly according to the present invention wherein the shutter is closed;

FIGS. 8A–8B depict a cross-sectional view and corresponding top view of two shutter assemblies according to the present invention;

DETAILED DESCRIPTION OF THE PREFERRED EMBODIMENT

Figure 1:
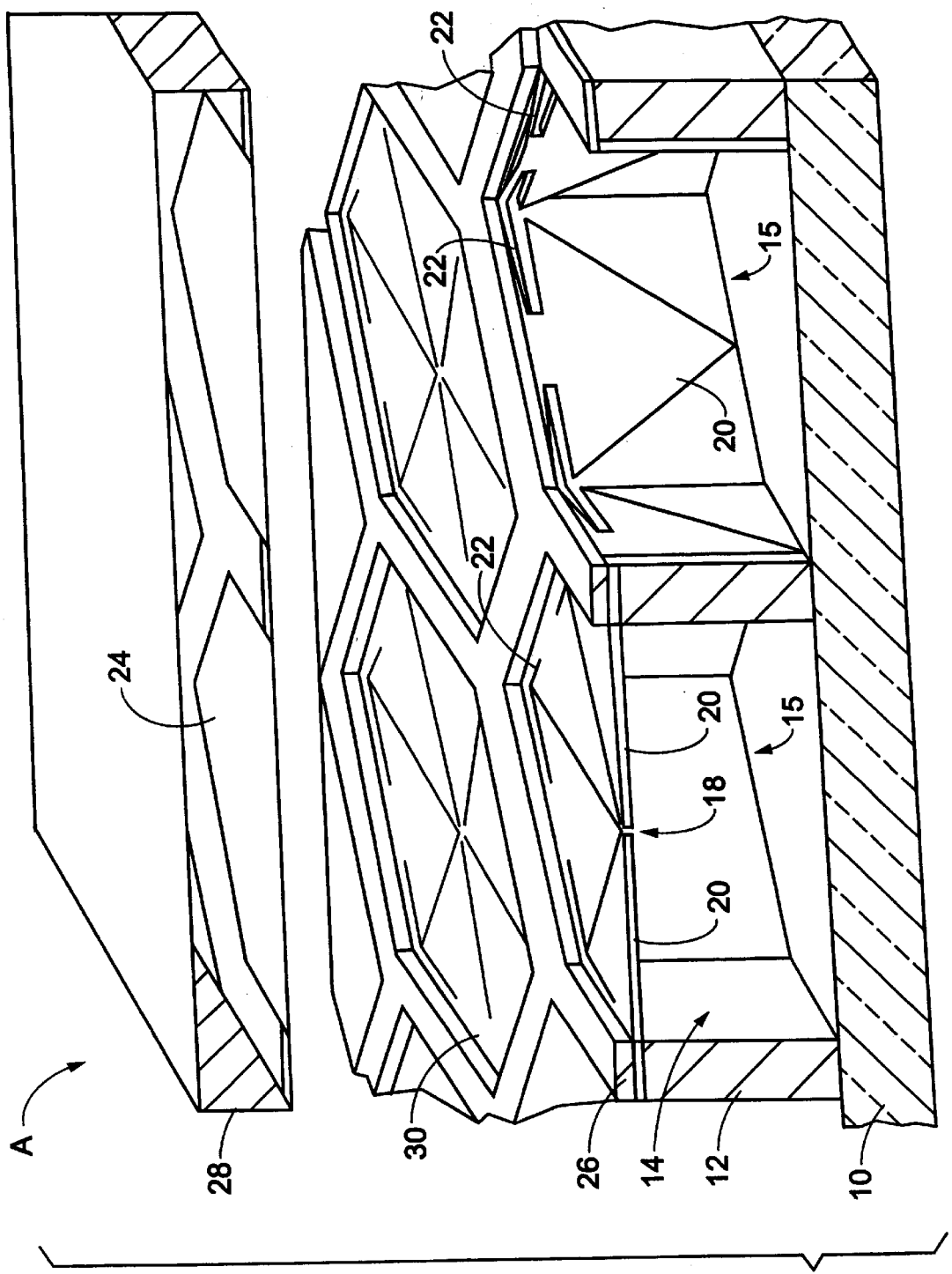
FIG. 1 is an exploded graphical representation of a hexagon shutter assembly according to the present invention.

FIG. 1 illustrates a hexagon shutter assembly A and FIGS. 3A–3D illustrate a square shutter assembly A' constructed in a stack layer formation according to the teachings of the present invention. It is to be understood that individual assemblies such as, assemblies A or A' are formed with a large number of like assemblies to form a 2-D densely packed array display.

While FIG. 1 is directed to a hexagon configuration and FIGS. 3A–3D are concerned with a square configuration, they are both constructed in accordance with similar procedures. FIG. 1 is shown with its opening or upper surface pointed towards the bottom of the page, while the assembly shown in FIGS. 3A–3D depicts the opening or upper surface pointing towards the top of the page. Therefore, the following discussion is relevant to both designs. Particularly, a top layer/film 10 is a transparent face plate used for protection purposes and can be thin glass, a laminated polymer film or other transparent material. A first layer down from top layer/film 10 is a conductive layer (or insulator coated with a conductive coating) 12 patterned with vertical sidewalls 14 to form cavities 15, which in this embodiment have an aspect ratio>0.5 (depth≧half the width). This implies the thickness of conductive layer 12 is at least half a pixel size (e.g. ≧100 μm thick for 200 μm wide pixels) of shutter assembly A (while the A designation will be used in the following discussion, it is equally applicable to shutter assembly A'). It is to be appreciated that cavity 15 is not required to have the above described aspect ratio, and will also function if sidewalls 14 are shorter than the length of the pixel size. Under this construction posts or otherwise known supports will be used to hold the top layer/film 10.

Conductive layer 12 is common to all pixels, i.e. electrically not pixilated, and only one electrical terminal 16 (e.g. FIG. 3A) is needed for an entire 2D array. Sidewalls 14 of conductive layer 12 are optically reflective and coated with a thin insulating layer (e.g. oxide).

Figure 2A:
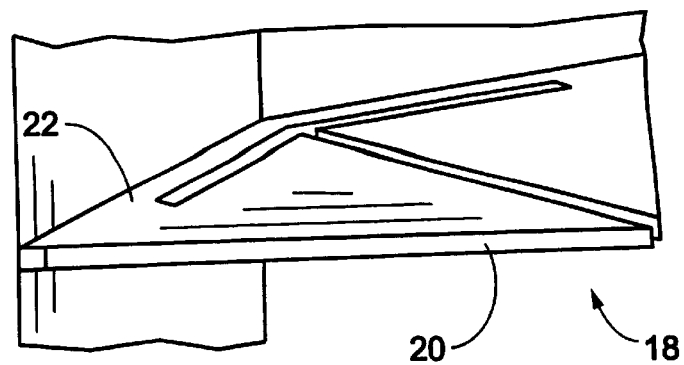
FIG. 2A is a close-up view of a shutter segment of the shutter assembly of FIG. 1 in a horizontal position.
Figure 2B:
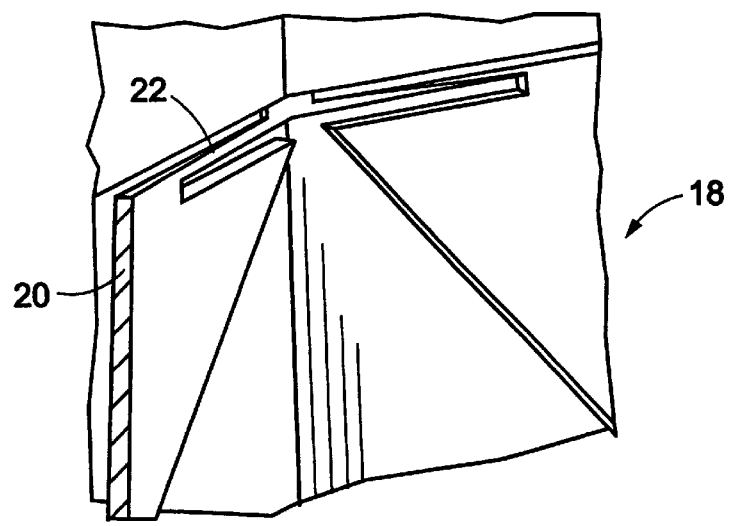
FIG. 2B is a representation of the shutter segment of FIG. 2A in a collapsed position.

A second film down in the stack is a thin conductive film (or insulator coated with a conductive coating) patterned in the shape of micro-electromechanical shutters 18 that is suspended near the bottom of cavity 15 by flexible members that give shutters 18 a rotational degree of freedom. In the embodiment shown in FIG. 1 and as further depicted in FIGS. 2A–2B, shutter segments 20 of shutters 18 are suspended with torsion springs or hinges 22 patterned out of the same film and in the same step as shutters 18. Also, and possibly in the same step, the second film down (i.e. shutters 18) is patterned to form rows of pixels that are electrically insulated from each other. Shutters 18 are also electrically insulated from conductive layer 12 that defines sidewalls 14.

In this embodiment, the front face of each shutter segment 20 is optically absorbing (black) and their back side optically reflective. It is to be appreciated, however, the front face (and a backside as well) could be made white, or any other color.

A third film down is a thin spacer film (insulator) 26, defining a small gap between the suspended shutters 18 and a bottom layer or backplate 28.

Bottom layer or backplate 28 is an electrically insulating support plate that can carry pixilated RGB color filter films 30 overlaying column address electrode 24 and column address electrode lines 32. When used with a reflective display, backplate 28 can be opaque and column address electrode 24 and lines 32 can be reflective metal. In the instance of a backlit or projection display, backplate 28 needs to be optically transparent (e.g. glass), as well as column address electrode 24 and lines 32. Row address lines 34 provide a path for row address pulses.

The present invention describes how, even for structures designed for small angles, shutter segments 18 can be twisted more than 90° without breaking. If they're made from single crystal silicon, the lifetime should not be an issue at all for practical purposes because SCS shows no fatigue, creep or plastic deformation, but lifetime is an issue for polycrystalline or amorphous materials. It has been reported that such materials may have under similar loading conditions lifetimes on the order of $10^5$ cycles (Poly, Al or Cr/Au). For these materials, torsion springs 22 need to be designed such that stress at 90° is below the fatigue limit or elastic stress limit. Such torsion springs should be longer and thinner than single crystal silicon.

Figure 2C:
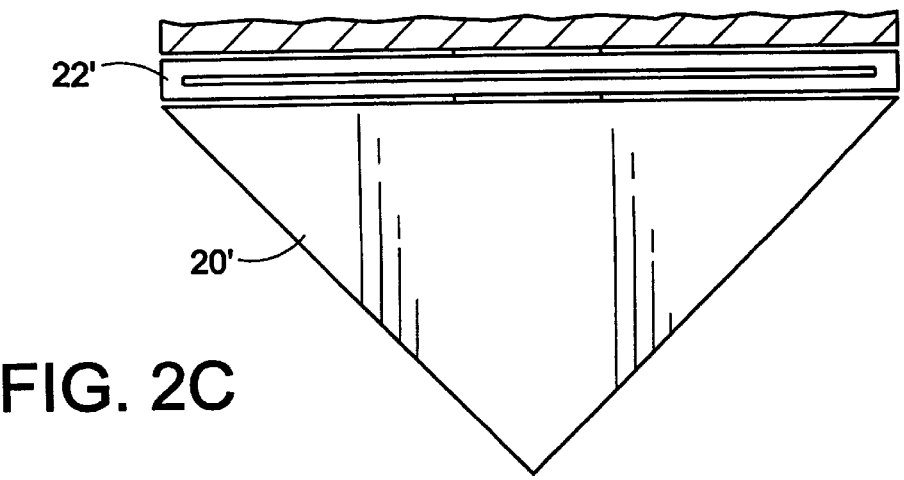
FIG. 2C depicts another embodiment for a shutter segment of a shutter assembly according to the present invention.
Figure 3C:
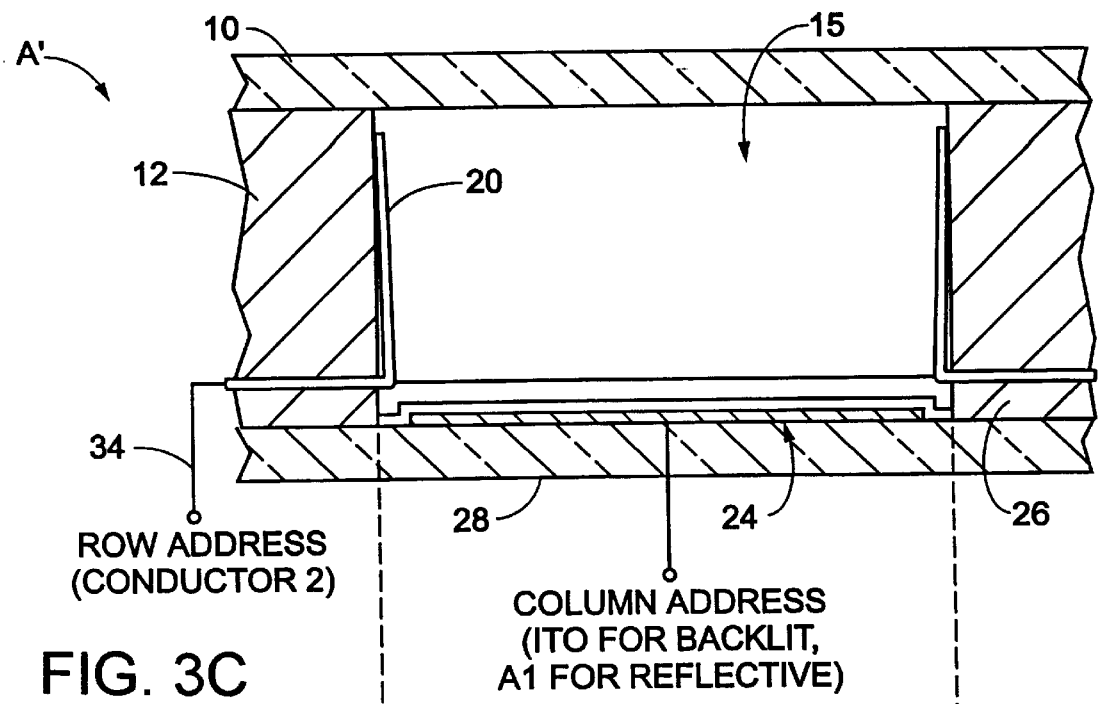
FIGS. 3C, 3D show a cross-sectional view of the shutter assembly shown in FIGS. 3A, 3B and a corresponding top view wherein the shutter is open.
Figure 3D:
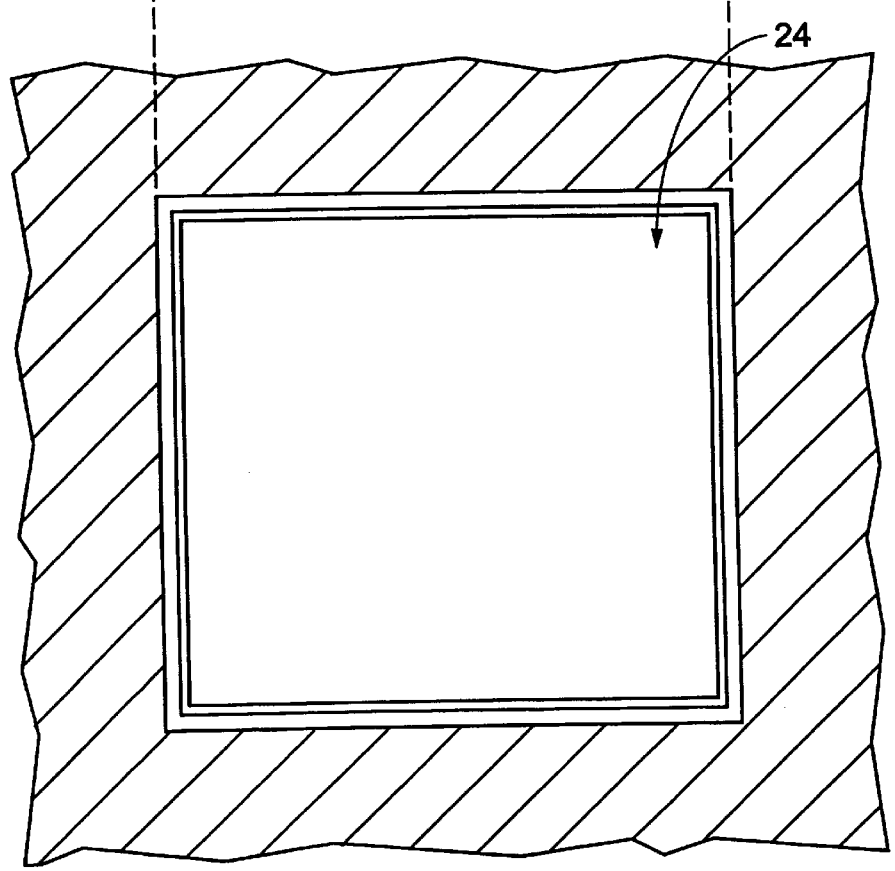

FIG. 2C illustrates a shutter segment 20' with a torsion spring 22' according to another embodiment of the present invention. Shutter segment 20' incorporates a longer torsion spring 22' into a limited pixel area by using folded beams with one or multiple turns. Shutter segments 20' according to this configuration are physically robust, in terms of handleability of the display, because they're single side clamped structures, not double side clamped and therefore immune to induced tensile or compressive stress.

The operational principles of shutter assembly A will now be discussed in connection with situations where, a) no voltage is applied, b) a bias voltage is applied, and c) an address voltage and a bias voltage are applied.

Operational Characteristics a) No Voltage is Applied

With particular attention to FIGS. 3A–3D, without electrical signals provided to any one of the conductors, i.e. sidewalls 14, shutter row addresses 34, and column address electrodes 24 on backplate 28, shutters 18 are in a monostable position, i.e. horizontal, deflection angle $\Theta=0°$.

b) A Bias Voltage is Applied

When a DC bias voltage is applied between sidewalls 14 and shutters 18, electrostatic forces generate a torque that pulls the torsionally hinged shutter segments 20 out of their neutral plane, towards sidewalls 14. Restoring torque from torsion springs 22 counteract this electrostatic torque. The equilibrium angle is the function of the relative magnitude of both torques, and the restoring torque of torsion spring 22 is proportional to the deflection angle $\Theta$ and the function of the spring length width and thickness and its material's shear modulus. It increases linearly with the angle to the horizontal ($\Theta$)), while the electrostatic torque is inversely proportional to the square of the angle to the vertical $(90°-\Theta)^2$, function of the area of shutter segments 20 and an applied bias voltage.

Depending on the bias voltage applied between shutter 18 and sidewalls 14, the restoring torque either stabilizes the electrostatic deflection at some angle (typically between 0 and 45°) or the electrostatic torque is larger than the restoring torque, in which case shutter 18 is unstable and is pulled-in to the $\Theta=90°$ position, i.e. vertical, up against one of sidewalls 14. The latter position is the desirable bias condition for operation of shutter assembly A and requires a DC bias 'Vb' to be applied beyond a certain critical threshold 'Vbc'.

Figure 5A:
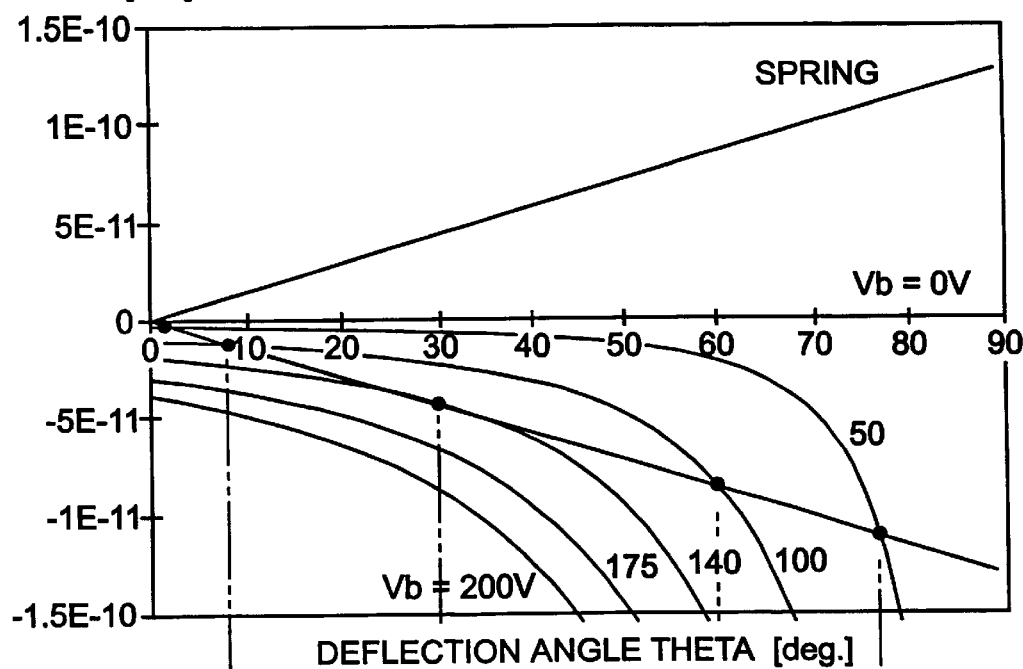
FIG. 5A provides a graphical representation of spring torque and electro-static bias torque vs. deflection angle with no address voltage.
Figure 5B:
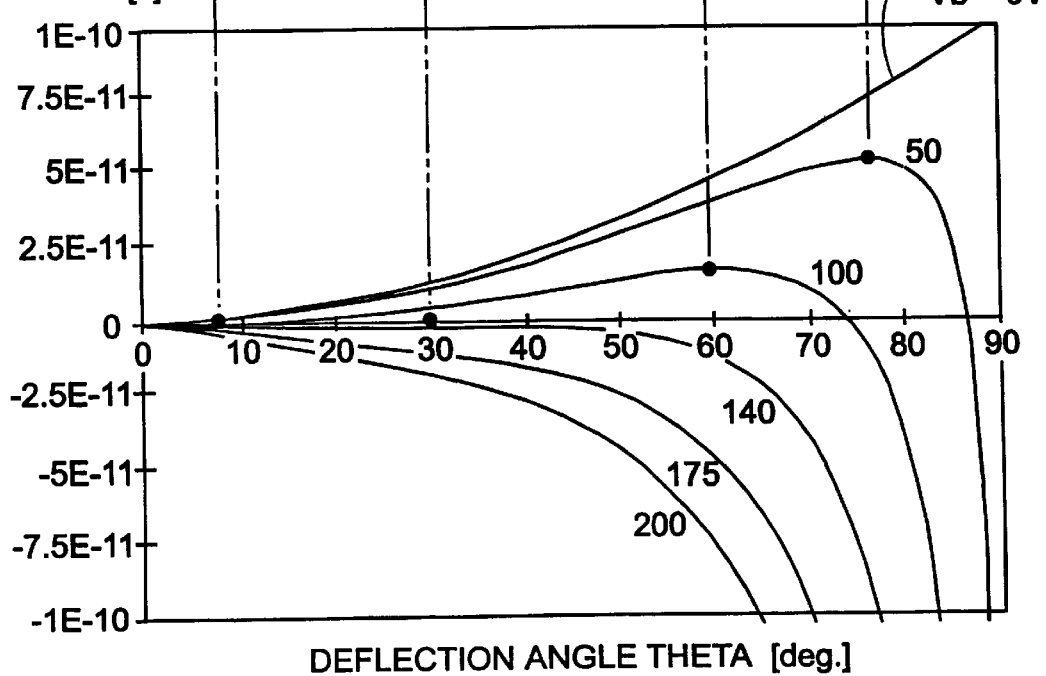
FIG. 5B is a graphical representation of stored potential energy vs. deflection angle with no address voltage.

FIGS. 5A–5B show an example of modeling (a $1^{st}$ order analytical) for the torques and potential energy versus the deflection angle, and for increasing bias voltages Vb.

FIG. 5A depicts results for shutter assembly with a 200 μm pixel size implemented in single crystal silicon. It shows that for Vb=0 (no bias), the only torque acting on a shutter segment 20, should it be brought off its neutral position, is the spring's restoring torque (linear with the deflection angle and in opposite direction). This torque brings shutter 18 back to its neutral position. The potential energy stored in the system is, in this case, parabolic with the deflection angle as shown in FIG. 5B. As the system strives towards minimum energy, shutter 18 is monostable in this case (only one minimum) with the equilibrium being at $\Theta=0$ (bottom of the parabola).

However, when Vb is not equal to zero (i.e. a bias voltage exists between shutter 18 and sidewalls 14), an electrostatic torque acts on shutter segments 20 in addition to the spring's restoring torque. The electrostatic torque is small for small deflection angles $\Theta$, but grows large rapidly with an increasing deflection angle $(1/(90°-\Theta)^2$ function). For a certain angle, the electrostatic torque is equal to the restoring torque as shown by the intersection points in FIG. 5A, which corresponds to a local minimum or maximum in the potential energy curve of FIG. 5B. For example, when in FIG. 5A a bias voltage of 50V is applied, the electrostatic torque intercepts the restoring torque at $\Theta \approx 2°$ and $\Theta \approx 78°$.

In FIG. 5B it is shown that the 2° shutter position is a local minimum (stable) and the 78° position is a local maximum (unstable). Therefore, if shutter 18 were brought beyond 78°, it would pull-in to the $\Theta=90°$ position (vertical). When below the 78° position, shutter segment 20 would move to the stable position at $\Theta=2°$. It is to be appreciated that these critical angles change with the applied bias voltage and shutter dimensions and geometry materials. This is depicted in FIG. 5B where for Vb=100V, the local minimum is at 8° and the local maximum at 60°.

At Vb=140V, the local maximum and minimum optima coincide at $\Theta=30°$. This is the critical bias voltage for the example of FIGS. 5A–5B. For bias voltages beyond 140V, the electrostatic torque is always larger than the spring's restoring torque, so there are no intersections in FIG. 5A, and no local minima in FIG. 5B (e.g. V=175V, V=200V), even at $\Theta=0°$. Shutter segments 20 will therefore have only one stable position, i.e. the vertical position at $\Theta=90°$, which is the desired bias condition.

c) An Address Voltage and a Bias Voltage is Applied

The next situation to be reviewed is where a bias voltage and an address voltage is applied to shutter assembly A. Under this condition, as illustrated in FIGS. 3A–3D, a second stable position (horizontal shutters, $\Theta=0°$) is created by applying address voltage 'Va' between shutter segments 20 and an address electrode 24 on backplane 28 in close proximity to shutter 18. Address electrode 24 causes an additional electrostatic torque (address torque) to act on shutter 18, one that counteracts the bias torque.

When the applied address voltage 'Va' is sufficiently high, the address torque is larger than the bias torque at small angles, and a stable shutter position is consequently created at $\Theta=0$, thereby making shutter assembly A bistable. The critical address voltage for which this happens is much smaller than the bias voltage because an address capacitor (which can be defined as a narrow gap parallel plate capacitor) has a much larger capacitance than the bias capacitor (which can be defined as a wide gap capacitor with 90° between its plates) with the shutter in horizontal position. This means that only the bias, which is common to all pixels, needs to be at a high voltage (i.e. on the order of a few 100V). All the pixilated switching and addressing can be done with low voltages (e.g. 5–10V).

Figure 6A:
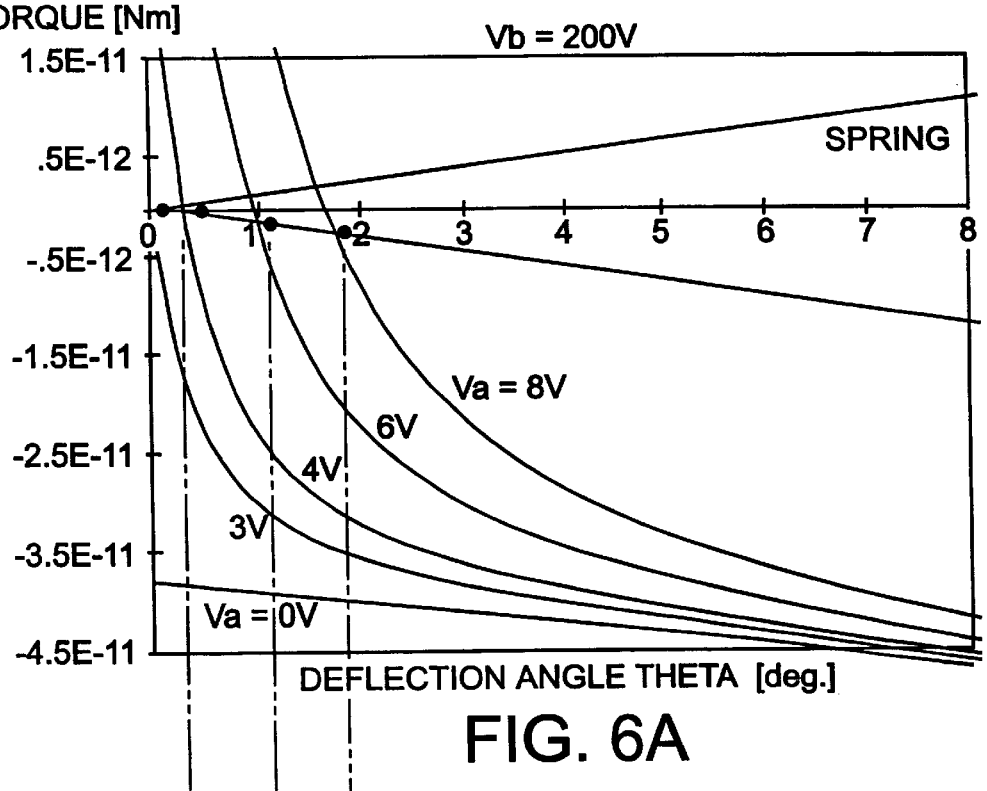
FIG. 6A sets out a graphical representation of electrostatic and restoring torque at varying bias voltages and an address voltage applied.
Figure 6B:
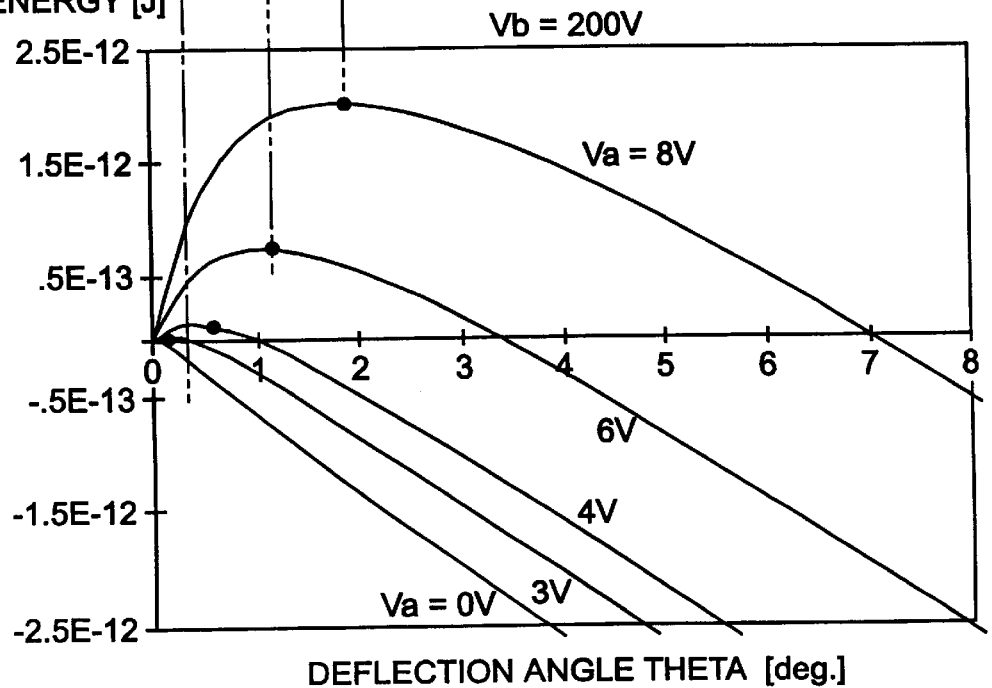
FIG. 6B is a graphical representation of total potential energy for an embodiment of the present invention at various bias voltages and an address voltage applied.

FIG. 6A shows simulated torques, and FIG. 6B potential energy for a properly biased case (e.g. Vb=200V from FIGS. 5A–5B), but now for different addressing voltages and focused in on the region near the origin of FIGS. 5A–5B (angles from 0 to 8° only shown). The curve 'Va=0V' of FIG. 6B shows again the instability of shutter 18. In the absence of an address voltage 'Va', shutter 18 will be vertical (Θ=90°), and the shutter assembly is in its bright state.

FIG. 6A also illustrates, however, that an address voltage of 3V or higher produces a positive electrostatic torque for Θ=0°, holding the shutter stable in its horizontal position, which puts the shutter assembly in its dark state. An address voltage beyond the address threshold 'Vta' (which is equal to 3V in the FIGS. 5A–5B and 6A–6B example) creates a 'dent' in the potential energy curve near the origin, producing a local minimum (which is a stable position) at Θ=0° (e.g. '4, 6 & 8 V' curves in FIG. 6B). Under the foregoing conditions shutter assembly A is bistable.

Starting off with shutters 18 in their horizontal state (dark) and no voltages applied, an address voltage 'Va' beyond the threshold is applied (e.g 5V) which holds shutters 18 in the horizontal state. Next, an appropriate DC bias of, for example, 200V is applied to sidewalls 14. As previously discussed the DC bias is commonly applied to all shutter assemblies of an array, and therefore is only connected to one electrical terminal. At this point, addressing voltage 'Va' still keeps shutters 18 in their horizontal state. The shutters that need to be brought into their 'bright' state can now be selectively 'released' by removing their address voltage 'Va', which removes the stable position at Θ=0° and hence pulls shutters 18 into remaining stable position, at Θ=90°, which is a vertical position thereby creating a bright state.

In one addressing sequence, a new frame is started by removing bias voltage 'Vb', returning all shutters 18 to the horizontal state and restarting the cycle. Alternatively, a particular shutter addressing line can be selectively reset by pulsing it with Vb, for a high voltage switching option. A third option for address selection is described in connection with FIGS. 16, 17 and 18, in following sections of the document.

It is to be noted that address threshold voltage is insensitive to variations in the dimensions of torsion springs 22. Variations in width, length or thickness of torsion springs 22 do affect the spring constant (which corresponds to the slope of the curve labeled 'Spring' in FIG. 6A), but this has very little effect on its intersection points with the electrostatic torque curves as depicted in FIG. 6B, which define whether or not shutter is stable in its horizontal state. This means the addressing is very robust. This can also be understood by realizing that in the horizontal state of the shutter, the tug of war is between the two electrostatic torques, not between an electrostatic torque and the spring's restoring torque, which is negligibly small for these small angles.

Figure 7:
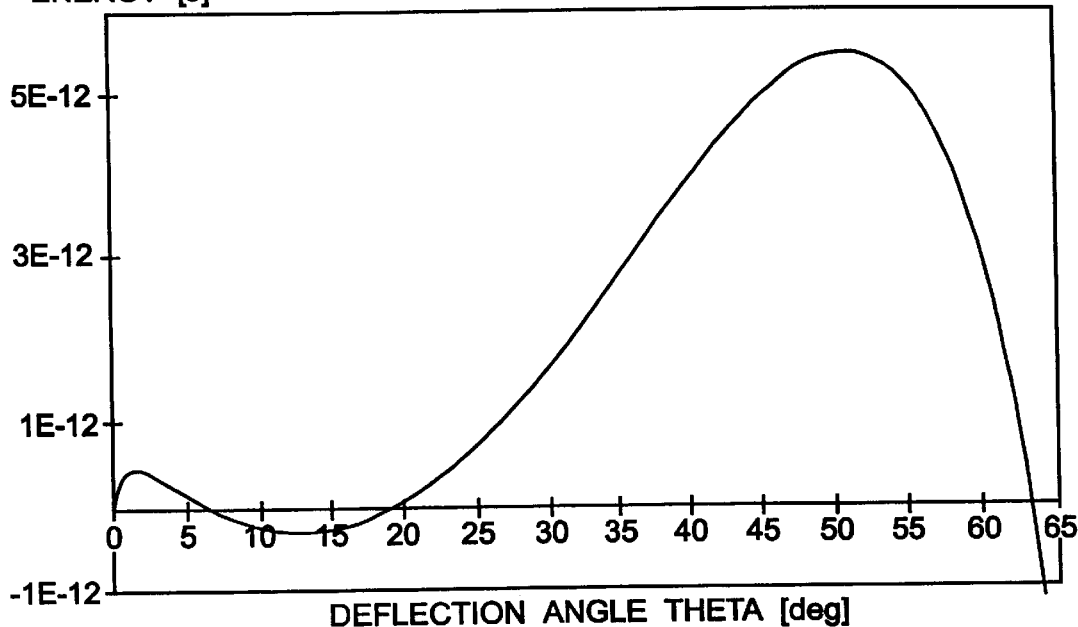
FIG. 7 graphically represents one example of a sub-threshold bias voltage having a maximum undesirable stable position at 13°.

The requirement the torsion spring 22 does need to meet is that its spring constant needs to be sufficiently low to keep the bias threshold voltage (e.g. 1400V curve in FIG. 5A) at reasonable levels. FIG. 7 details an example of what happens when an address voltage 'Va' is removed under sub-threshold bias conditions. When the address voltage is removed, shutters 18 find a stable position at 13° deflection instead of 90°. Robustness in this respect is easily achieved by respecting a safety margin in the applied bias voltage (e.g. 175V or 200V instead of 140V in FIG. 5A). This makes achieving appropriate bias insensitive to variations in the spring constants as well.

A Shutter Assembly Configured in Single Crystal Silicon

FIGS. 8A–8B are conceptual sketches for an embodiment of shutter assembly A" configured in Single Crystal Silicon (SCS).

Shutter assembly A" consists of 3 wafers, 2 glass and one SOI silicon (Silicon On Insulator). Bottom glass wafer 40 carries the ITO or Al column address electrodes 42 and pixilated color filters (R,G,B) 44. Top glass wafer 46 is unpatterned and is provided for protection purposes. Middle wafer 48 is a SOI wafer, i.e. Si substrate with a silicon oxide layer buried underneath a thin single crystal silicon top layer.

The thickness of top wafer 46 is made equal to the desired thickness of the torsion springs 50 and shutter segments 52. The shutter assembly cavities 54 are etched in the substrate using a high aspect ratio Reactive Ion Etch (RIE) (e.g. aspect ratio of divider walls=20:1, STS "Surface Technology Systems") which automatically stops on the buried oxide, leaving a thin SCS membrane suspended over cavity 54. In this embodiment, the substrates have a thickness not much larger than half the pixel width (unless the reflectivity of the sidewalls is very high, in which case the viewing angle and contrast ratio may not be affected very much by having 'deeper' pixels). Also, as previously discussed, shorter sidewalls may also be formed. A CVD oxide is deposited on the front side of the wafer and patterned to provide an appropriate space layer 56. Very thin coats of metals or oxides can be used to tailor the optical reflection/absorption/opacity (e.g. 300 Å al for >80% reflectivity).

In a second RIE etch, from the front side of the wafer, the membrane is perforated in the shape of the shutters, the torsion springs 50, anchor points 58 and row/row isolation trenches 60. Finally, the layers are assembled e.g. using EPON adhesive wafer bonding process developed for TIJ (Thermal InkJet) or other known bonding process. Additionally, other silicon fabrication approaches, polysilicon on glass approaches, as well as the use of lamination based polymer approaches, could also be used.

Modeling a Shutter Assembly

Figure 9:
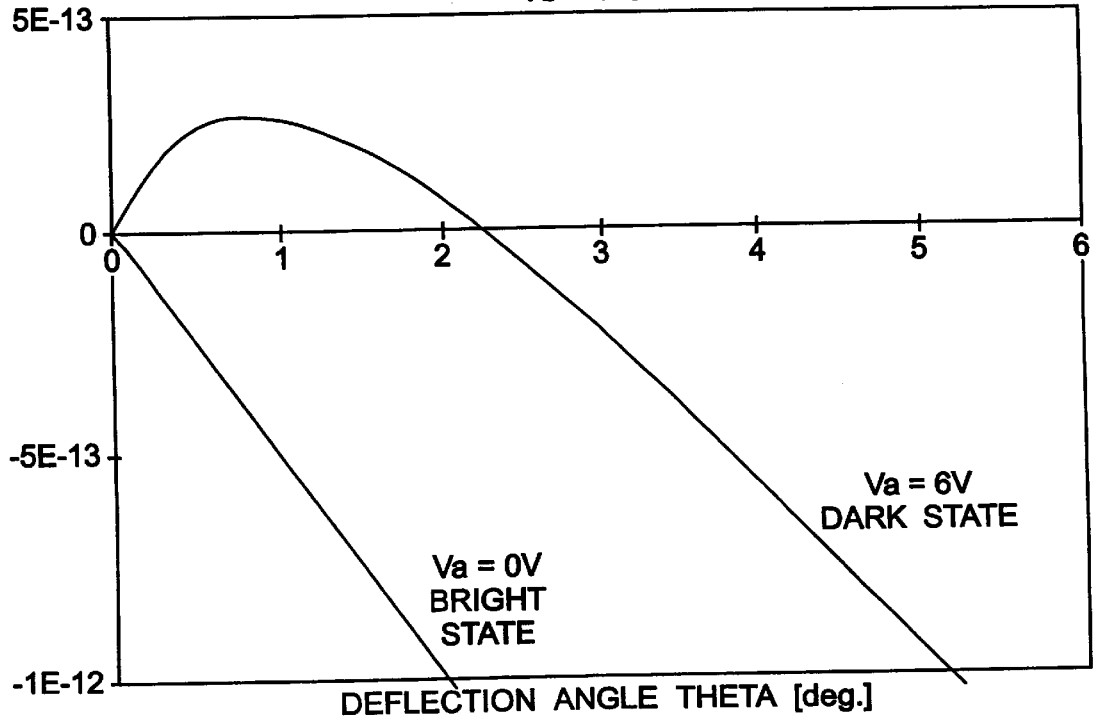
FIG. 9 is a graphical representation of energy vs. angle curves for shutter assemblies for the present invention.

Attention is now directed to Tables 1A, 1B and FIG. 9 to assist in the presentation of a quantitative example of 1$^{st}$ order analytical modeling, showing shutter and spring dimensions, material properties and bias voltage as inputs, and the threshold address voltage, resonance frequency and stress margin as outputs.

Figure 4A:
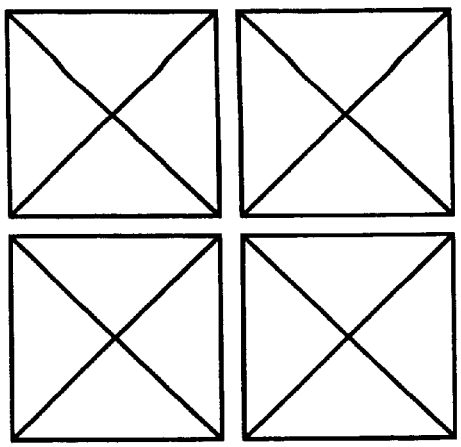
FIGS. 4A–4C depict varying shutter assembly geometries.
Figure 4B:
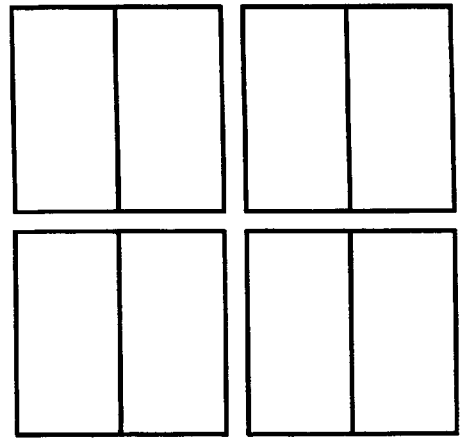
Figure 4C:
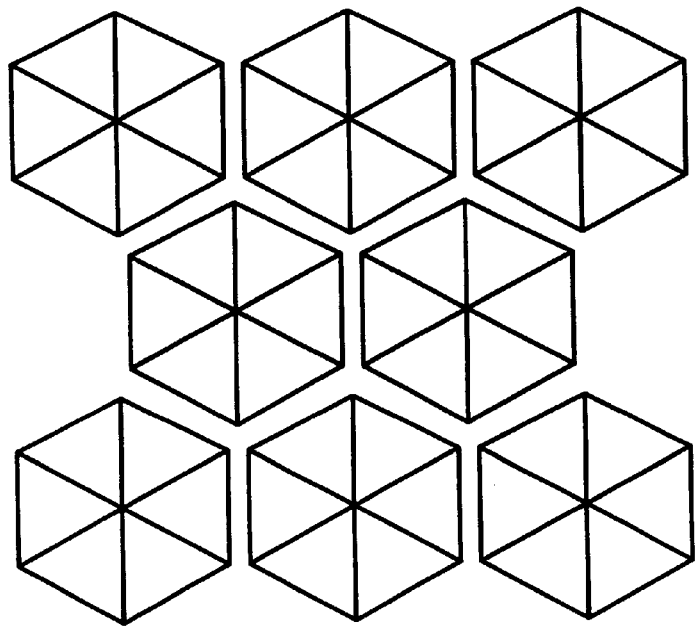

The values presented are for a square 200 μm wide 2-segment shutter assembly A of the shutter assembly array, such as depicted in FIG. 4B. The width of one shutter segment 20 is 100 μm, its length 200 μm and its thickness 0.75 μm. The torsion springs 22 are 180 μm long, 2 μm wide and 0.75 μm thick. The air gap between shutter 18 and address electrode 32 is 1.5 μm and the fill factor of the address electrode is 1. A fill factor is defined as the area of the electrode relative to the shutter area. With an applied bias voltage 'Vb' of 175V (the threshold bias is 140V under the above conditions), the address threshold voltage is 4V, the 1$^{st}$ mode resonance frequency is on the order of 12 kHz, and the stress margin is approximately 12× (maximum stress in the torsion springs 12 times below the yield strength).

FIG. 9 shows the corresponding energy vs. angle curve, for an address voltage of 6V.

TABLE 1A

| Shutter | | | Torsion spring | |
|---|---|---|---|---|
| Length | L | | 2.00E-04 | [m] Half length |
| TL 1.80E-04 | [m] | | | |
| Width | W | | 1.00E-04 | [m] Width |
| TW 2.00E-06 | [m] | | | |

TABLE 1A-continued

| Hinge gap g 7.50E-07 [m] | | 7.00E-06 | [m] Thickness TT |
| --- | --- | --- | --- |
| Address electrode | | | Material |
| Airgap G 6.40E + 10 [Pa] | | d 1.50E-06 [m] | Shear-modulus |
| Fill factor Rho 2.30E + 03 [kg/m^3] (area) 7.00E + 09 [Pa] | | FF 1 [-] | Density |
| | | | Yield strength Tmax |
| Bias voltage | | | Address voltage |
| Top VA1 0 [V] | VB [V] | 175 | [V] Column (Si) |
| | | | Rpw (ITO)    VA2 6 |
| Outputs: | | | |
| Resonance frequency | Fn 1.202E + 04 | [Hz] | |
| Stress margin | Tmax/T 11.7 | [X] | |
| Address threshold Ts 17E-06 [s] | Vt 4.0 | [V] | Switching time: |
| | | | Frame rate: |
| 19 [fr/s] | | | |
| | | | 320Li (=2.5"), 10 × hold time |

TABLE 1B

| Shutter | | | Torsion spring |
| --- | --- | --- | --- |
| Length TL 9.00E-05 | L [m] | 1.00E-04 | [m] Half length |
| Width TW 1.50E-06 | W [m] | 5.00E-05 | [m] Width |
| Hinge gap g 3.50E-07 [m] | | 6.00E-06 | [m] Thickness TT |
| Address electrode | | | Material |
| Airgap G 6.40E + 10 [Pa] | | d 1.00E-06 [m] | Shear-modulus |
| Fill factor Rho 2.30E + 03 [kg/m^3] (area) 7.00E + 09 [Pa] | | FF 1 [-] | Density |
| | | | Yield strength Tmax |
| Bias voltage | | | Address voltage |
| Top VA1 0 [V] | VB [V] | 200 | [V] Column (Si) |
| | | | Rpw (ITO)    VA2 6 |
| Outputs: | | | |
| Resonance frequency | Fn 2.811E + 04 | [Hz] | |
| Stress margin | Tmax/T 8.1 | [X] | |
| Address threshold Ts 3.90E-06 | Vt 5.6 [s] | [V] | Switching time: |
| | | | Frame rate: |
| 40 [fr/s] | | | |
| | | | 640Li, 10 × hold time |

Characteristics of Shutter Assembly a. Color

Figure 10A:
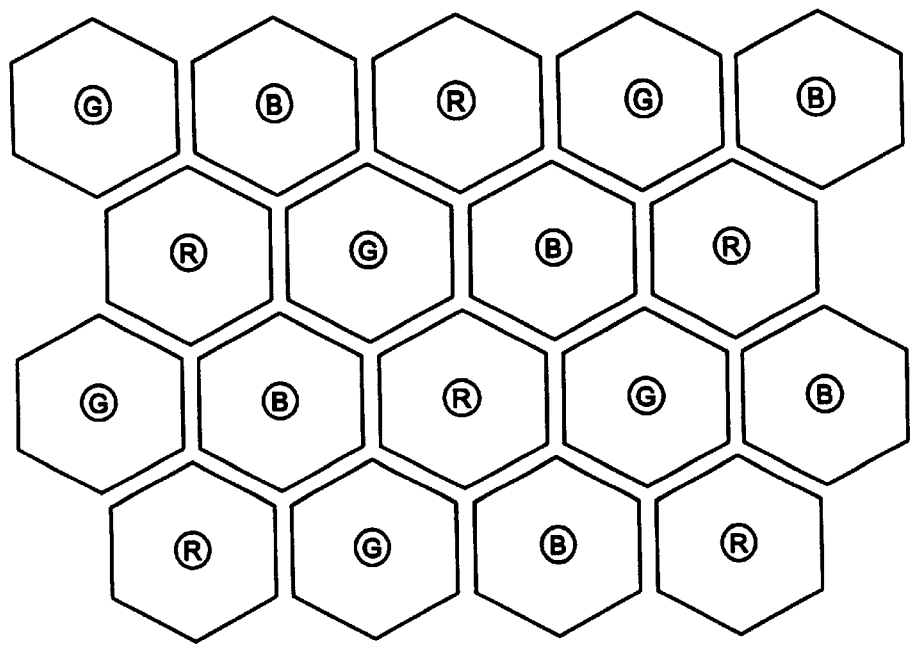
FIG. 10A depicts one embodiment of providing a color grey scale array wherein one color is provided per an individual shutter assembly.
Figure 10B:
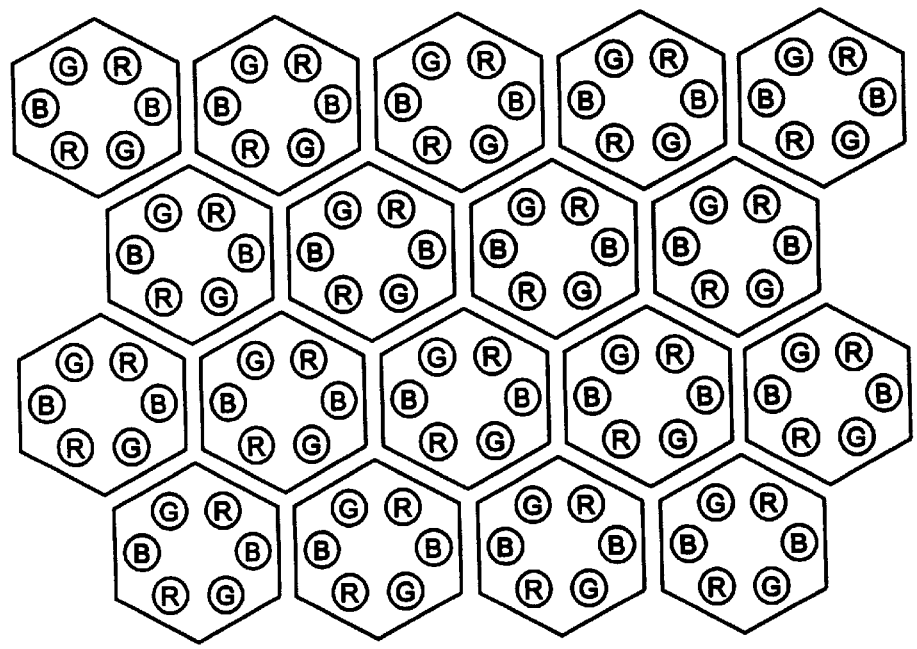
FIG. 10B shows a further embodiment of color grey scale array in the time domain wherein a plurality of colors are provided for within a single shutter assembly.
Figures 11A, 11C, 11E:
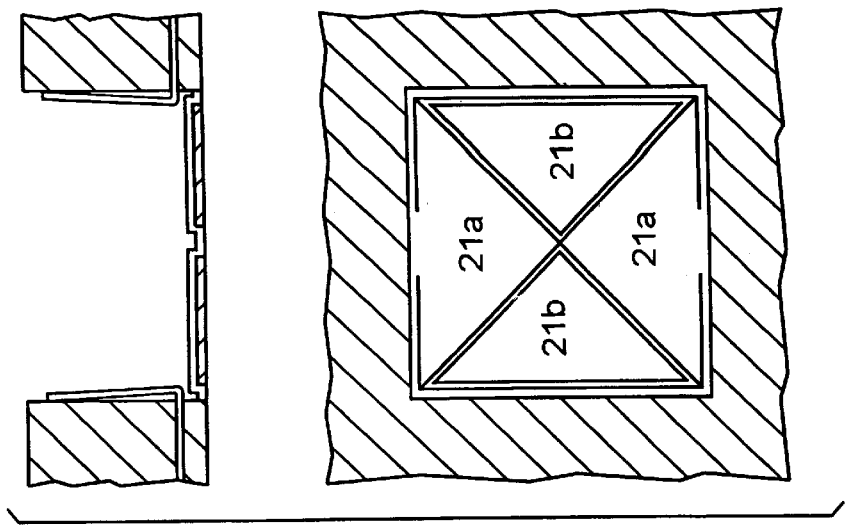
FIGS. 11A–11F illustrate varying positions of a shutter assembly operating in a space domain bistable grey scale environment wherein multiple segments per shutter assembly are depicted and which use a segmented address electrode.
Figures 11B, 11D, 11F:
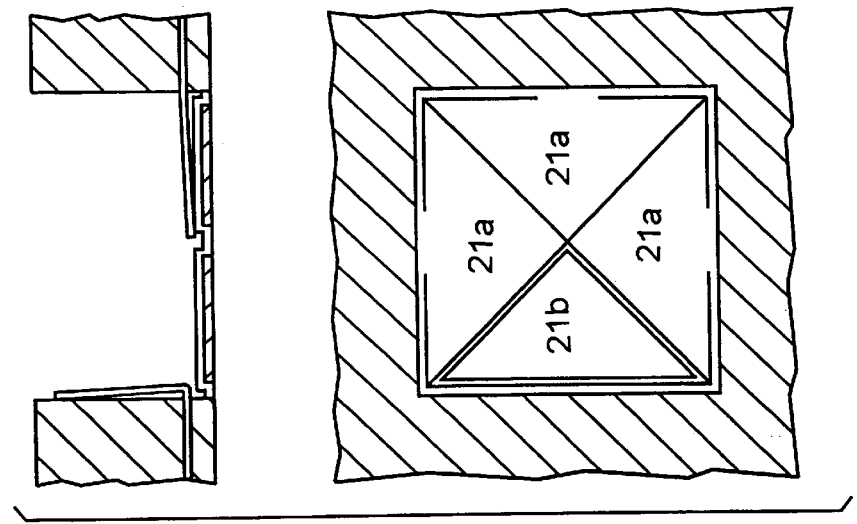

A color display according to the present invention can be achieved in a number of ways, two of which are shown in FIGS. 10A–10B.

FIG. 10A proposes one color filter per pixel (RGB pixilated polymer coatings). In the case of a reflective display, these filters would be reflective filters or transmissive filters on top of a reflective back surface. For a transmissive backlit or projection display, these would be transmissive filters on top of a transparent back surface.

FIG. 10B proposes having one color filter per shutter segment, i.e. all RGB filters in each pixel. This approach would allow the pixels to be larger (for the same effective display resolution), relaxing various fabrication aspects.

In the FIG. 10A approach, the multiplicity of segments per pixels could be used to obtain bistable grey scale as an alternative to time-domain greyscale. This concept is discussed more fully in the following sections.

b. Greyscale

Greyscale can be achieved in the space-domain and/or the time domain.

i. Space domain greyscale:

In the case of FIGS. 10A–10B, one color per pixel and multiple segments per pixel, it is possible to also segment the underlying address electrodes as illustrated in FIGS. 11A–11E. The address electrodes being conductors supported by a substrate. It is noted that in FIGS. 11A–11F the black triangles 200 move and the white triangles 206 are static. If the address electrode segments have a different area (different fill factor, defined as the ratio of the address electrode segment and the shutter segment areas), the different shutter segments 20 of shutter 18 switch at different address threshold voltages 'Va', even if they are electrically connected to the same address line.

Figure 12:
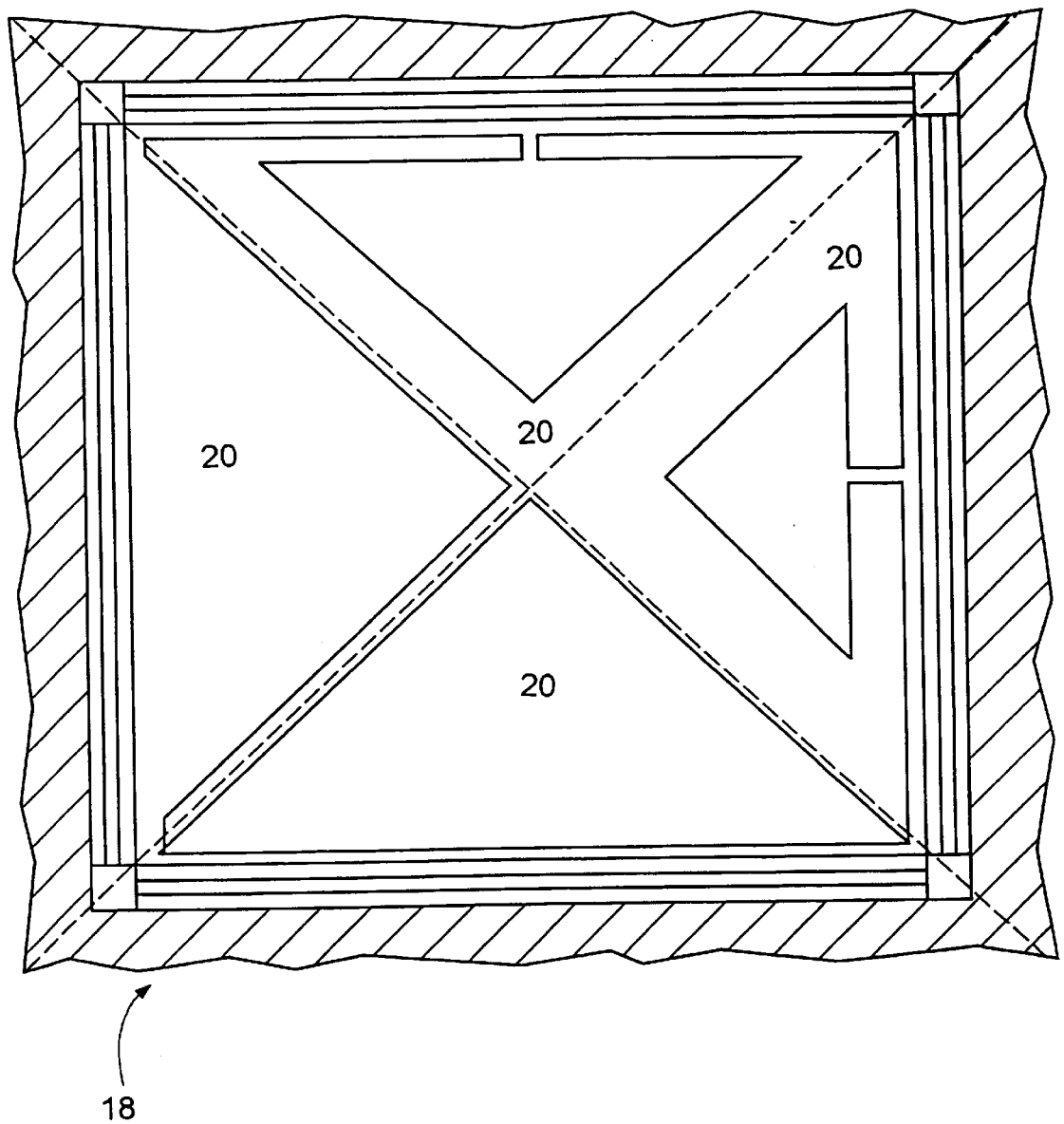
FIG. 12 depicts a top view of a step-wise analogue grey scale with segmented address electrodes of different fill factors.
Figure 13:
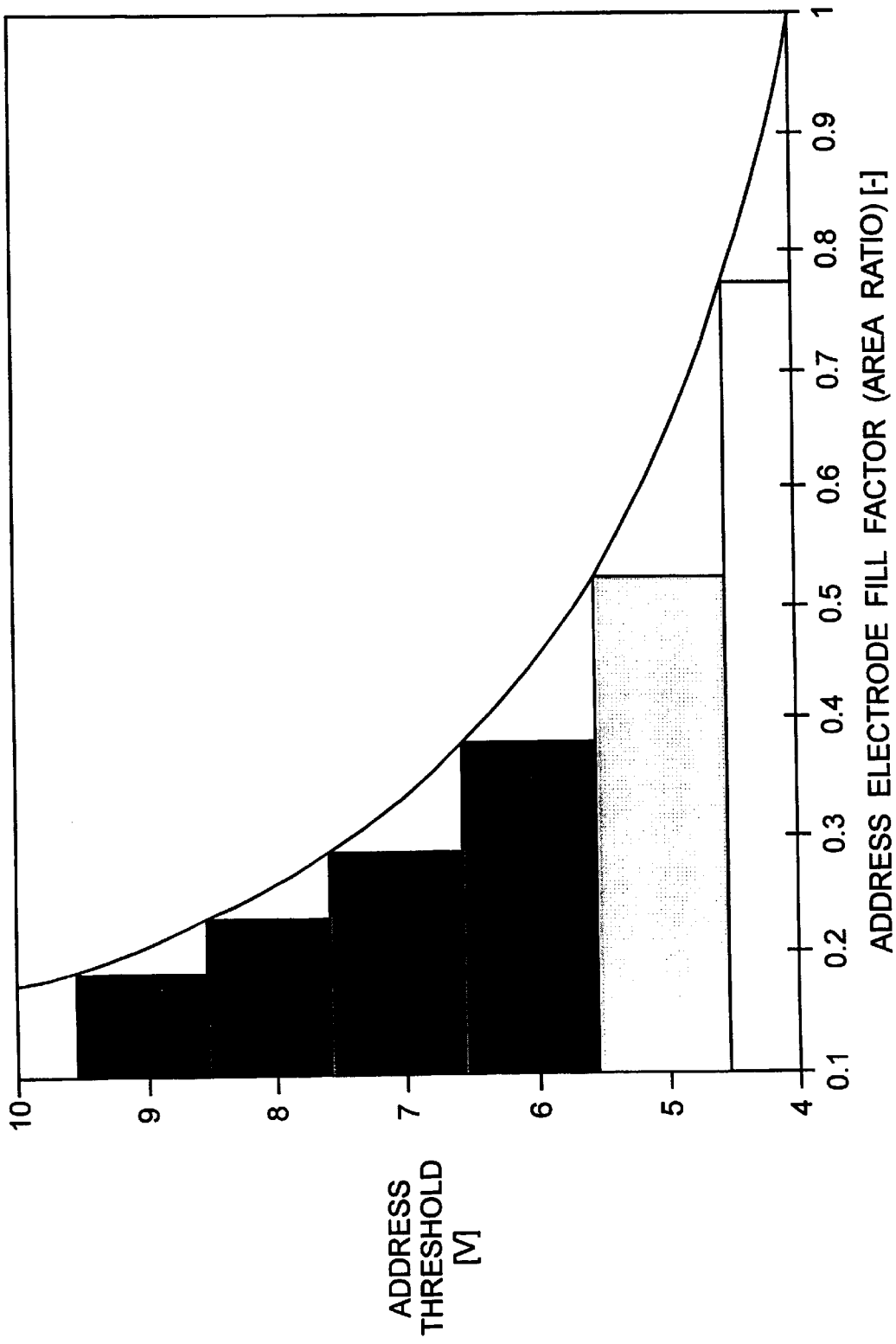
FIG. 13 is graphical representation of a step-wise analogue bistable grey scale depicting address threshold voltage vs the address electrode fill factor.

FIG. 13 is a simulated curve of the address threshold voltage as function of the address electrode fill factor. It uses the conditions and dimensions as in Table 1A. It is assumed in this graph that the address segment is centered under its shutter segment 20, as shown in FIG. 12. All silicon shutters are identical, only the underlying address electrodes that are patterned into capacitor plates are of different areas. The required address threshold is a parabolic function of the fill factor. The example in FIG. 13 shows how, for example, 6 bistable greyscale levels are obtained in a hexagonal shutter assembly, with thresholds from 4 to 9 volts, spaced 1 volt apart, and that the required geometric fill factors of the 6 electrode segments would have to be from 1 down to 0.16.

Using the foregoing approach, bistable greyscale is achieved essentially for free. It will be appreciated that a bistable greyscale display is compatible with a passive matrix addressing scheme which has been developed by the inventors and which is described more fully below.

ii. Time domain greyscale:

A different approach to greyscale display is to exploit the high bandwidth of the shutter assembly (e.g. resonance in the order of 10 kHz or higher) to achieve greyscale in the time domain. With a bandwidth of 10 kHz, it is possible to switch shutter segments 20 between the dark and bright states a large number of times within each frame. The eye averages the fast switching and the overall brightness appearance (greyscale) of the pixel is proportional to how many of the time increments within the video frame the shutters were in the 'bright' state versus in the 'dark' state.

The cost of time-domain greyscale is increased power consumption, i.e. AC charge/discharge current. Also a line-reset scheme needs to be used instead of a 2D frame reset. This is possible in a passive matrix using HV reset pulses on the shutter lines, as is more fully described below.

c. Passive Matrix Addressing i. 2D Frame Reset, Low Voltage Switching

Passive matrix addressing of an array of shutter assemblies A can be accomplished with a sequence as in FIGS.

14A–14C (e.g. 4×4 array). The horizontal address lines represent the row electrodes (the different rows of shutters are electrically isolated; the shutters within each row are electrically connected to each other) and the vertical lines represent the column electrodes (the different columns of address electrodes on the backplate are electrically isolated, and the electrodes within each column are connected.)

Figure 14A:
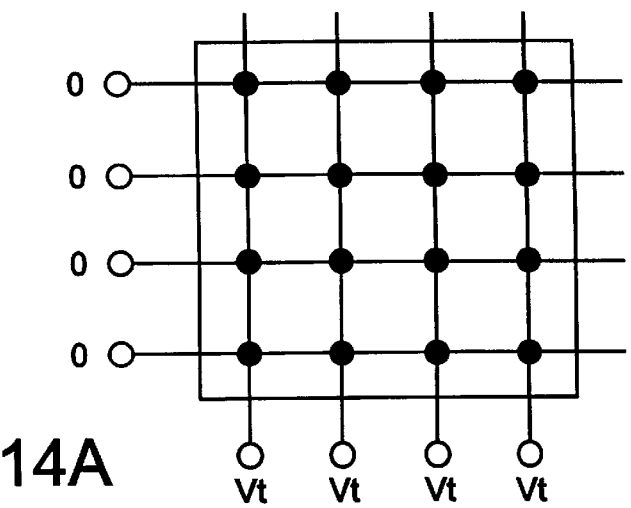
FIGS. 14A–14C illustrate a passive matrix addressing scheme.

In a second alternative for address switching, attention is directed to FIG. 14A, wherein the starting point of the addressing is with all rows at 0 V and all columns at a voltage slightly above address threshold voltage 'Vta', e.g. 5 V. The bias voltage 'Vb' applied to all sidewalls 14 is above bias threshold voltage 'Vbt', e.g. 200V. In this configuration, all pixels are in the dark state (shutters flat).

Figure 14B:
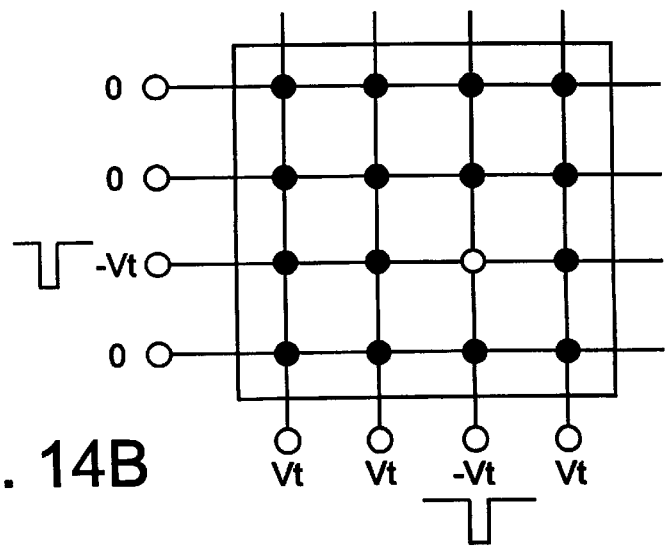

To bring a certain pixel to the bright state, both its row and column lines are pulsed down to −Vt, while all other columns remain at +Vt and all other rows at 0 V. The shutter segments in the pixel to be switched now only see bias voltage 'Vb' and switches to the 90° position (0V across the shutter and the address electrode below). The other pixels either see 'Vt' or '2Vt' between their shutters 18 and address electrodes 32, both in excess of the address threshold voltage 'Vta'. These will therefore stay in the dark state as shown in FIG. 14B.

Figure 14C:
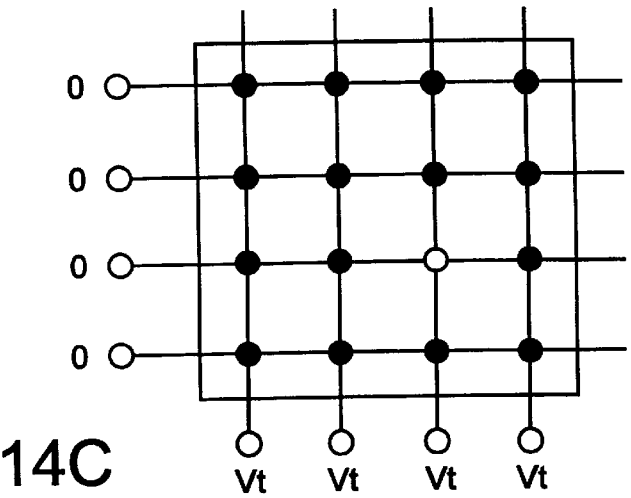

After switching of the pixel, its row and column lines can be brought back to 0 and +Vt respectively because of the bi-stability in the presence of the bias field. This brings the switching back to the original configuration, set forth in FIG. 14C, ready to switch the next pixel (or row of pixels) and so on.

As an alternative to the above discussed operation, +Vt could be added to all lines, which would result in avoiding switching to negative voltages.

The minimum duration of the address pulses is defined by the time required to bring the shutters beyond the local maximum in the potential energy curve. For example, in FIG. 9, to bring the shutters beyond 2° deflection angle. This takes 17 $\mu$s under the conditions in Table 1A (200 $\mu$m pixels) and about 4 $\mu$s in Table 1B (100 $\mu$m pixels). Under the '2D frame reset' scenario, the entire 2D array is reset to start a new frame (by momentarily resetting the bias voltage) and a 'holding' time must therefore be built in to avoid lines written later to appear dimmer than lines written earlier. If a 10× holding time is assumed, the corresponding frame rate in Table 1A is about 20 frames per second (for a display with 320 lines at 200 $\mu$m per line) and about 40 frames per second in Table 1B (for a VGA display sized with 650 lines at 100 $\mu$m per line). These frame rates appear acceptable for small display (i.e. PDR/PDA) type applications. For higher frame rates and/or larger displays, a line reset scheme can be used. The line-reset scheme does not require any changes in the display hardware geometry (i.e. FIGS. 1–3B still apply), but can use a high voltage reset pulse on the shutter lines. The passive matrix scheme still works as well, even in combination with the bistable grey scale.

ii. 1D Line Reset

To selectively reset one line of a shutter in the array, the voltage on the line is momentarily pulsed to the bias voltage (e.g. the 175V in Table 1A). The shutters in this line that were in the 'down' state prior to the reset pulse will stay in the 'down' state because they now see even a much larger voltage across their address capacitor (parallel plate capacitor). The ones that were in the 'up' state on the other hand reset to the 'down' state because the voltage between shutter 18 and sidewall 14 is zero during the reset pulse (i.e. both at 175V). This allows them to be 'captured' again by the address field.

Line reset allows selective refreshing of parts of the display. This allows for higher speeds, and reduces the AC power consumption.

iii. Display Addressing Implementation

Figure 15A:
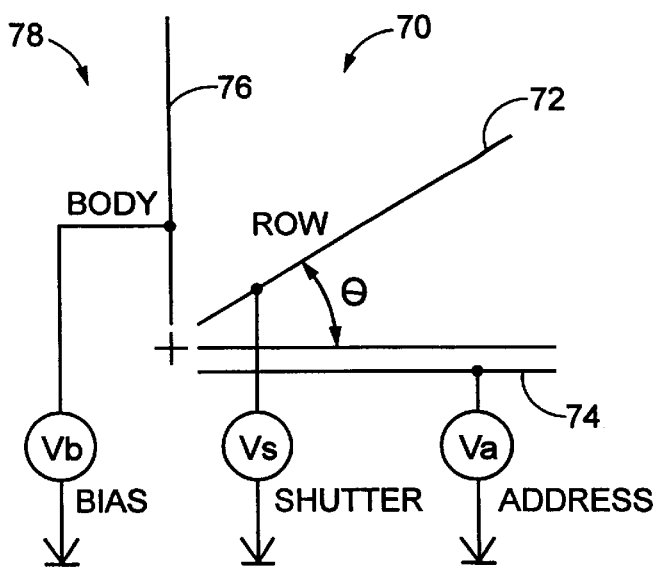
FIGS. 15A–15C are depictions assisting in the understanding of a addressing scheme according to the present invention.
Figure 15B:
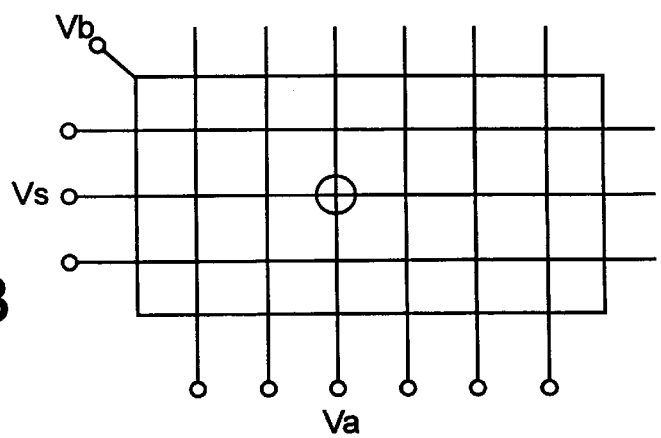
Figure 15C:
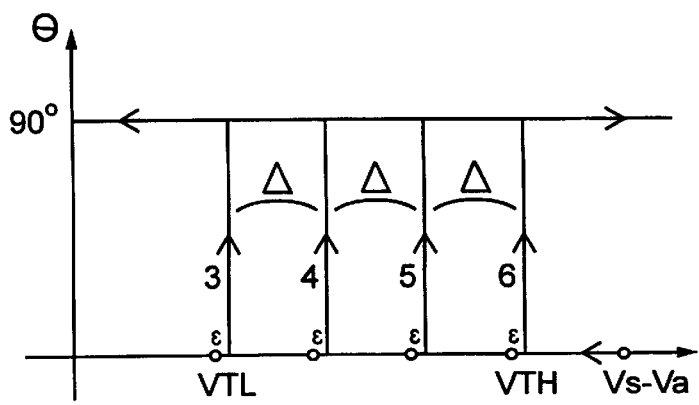

A display implementing an array of shutter assemblies A according to the present invention can be addressed by a variety of schemes. A preferred manner is depicted in FIGS. 15A–15C. This particular addressing scheme is a passive matrix type compatible with bistable grey scale (multiple shutter segments per pixel) and requires only low voltage (e.g. ≦20V) switches on the rows and columns. One discrete high-voltage switch (e.g. 150V) is required to switch the body of the array (i.e. cavity sidewalls). FIG. 15A represents a schematic cross-section of half a pixel, FIG. 15B represents a schematic top view of a 3×6 array, and FIG. 15C is a hysteresis diagram showing a scenario with 4 shutter segments per pixel (e.g. 4 triangles forming a square pixel). FIGS. 16A–16F illustrate an example of a 3×6 array being addressed. FIG. 17 is a timing diagram for this example. The foregoing figures are explained in more detail in the following discussion.

Turning attention to FIG. 15A which is a schematic cross-section of half a shutter assembly 70, the torsionally suspended shutters 72 are electrically connected into rows (the voltage on a row is denoted Vs, i.e. V-shutter). Address capacitor plates on backplane 74 are electrically connected into columns (the voltage on a column is denoted as Va, i.e. Vaddress). Sidewalls 76 of the body 78 for all shutter assemblies 70 are electrically connected, i.e. the 'body' of the array (the bias voltage on the body is denoted as Vb, i.e. Vbody or Vbias). As previously described, the position of the shutter (angle $\Theta$) is determined by a 'tug-of-war' between two electrostatic fields. The field between the shutter and the body (determined by Vb−Vs) pulls the shutter towards the vertical ($\Theta\rightarrow 90°$), while the field between the shutter and the address electrode on the backplane (determined by the voltage Vs−Va) pulls the shutter towards the horizontal ($\Theta\rightarrow 0°$, or even slightly negative angle, FIG. 15A). After applying voltages Vb, Vs and Va, the state of the shutter is determined by its previous state and by the magnitude of (Vs−Va) vs. (Vb−Vs). The voltage (Vs−Va) is the difference between the row and column voltages. The voltage (Vb−Vs) is the difference between the body voltage (Vb) and the row voltage (Vs) (see FIG. 15B).

FIG. 15C shows an example of a shutter-state hysteresis loop. The horizontal axis represents (Vs−Va) (row minus column); the vertical axis represents the state of 4 individual shutter segments in a square pixel (vertical, $\Theta\approx 90°$ or horizontal $\Theta\approx 0°$). The 4 address electrodes on the backplane, corresponding to each of the 4 shutter segments, have a different area and the address threshold voltage is therefore different for the 4 segments. The foregoing has previously been discussed in connection with FIGS. 11A–11E.

In the example of FIG. 15C, the first shutter segment flips from the horizontal into the vertical position ($\Theta: 0\rightarrow 90°$) in the presence of the bias voltage on the body, as soon as the voltage (Vs−Va, i.e. row/column difference) is brought below 6 V, the second shutter flips when (Vs−Va)<5V, the third when (Vs−Va)<4V and the forth one when (Vs−Va) <3V. If (Vs−Va)≧6V, all four shutters are in the horizontal state (i.e. black). A 4-segment shutter is potentially capable of 5 levels of grey scale (black, grey1, grey2, grey3, white).

An important characteristic of the addressing hysteresis loop is also that typically 150V bias is required to flip the shutters vertical, but much less voltage is required to keep shutter segments vertical, because the sidewall/shutter capacitance is much larger in the vertical state. This means that the bias voltage on the body of the array can be brought down to 20V or so (from 150V) after a line is addressed, without the vertical shutter segments flipping back into their horizontal position. This property will be used to avoid high voltage switches on rows or columns as will be discussed below.

FIGS. 16A–16F illustrates an addressing example, and FIG. 17 a set of segments on a time line. The figures correspond to the example hysteresis loop in FIG. 15C.

Figure 16A:
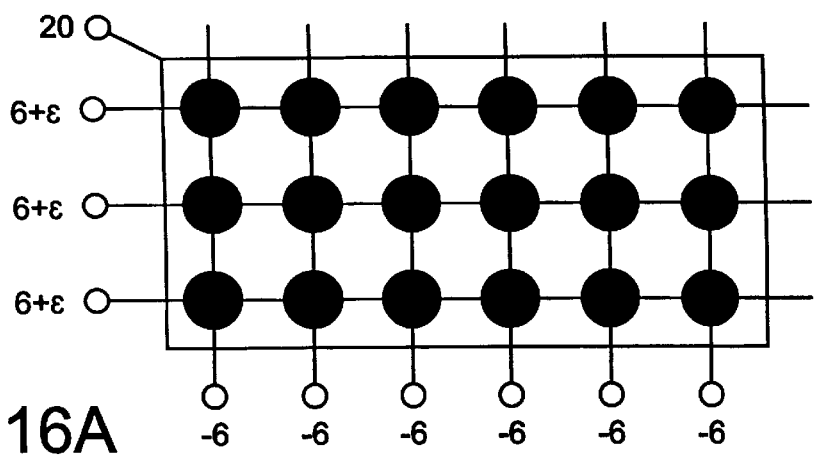
FIGS. 16A–16F illustrate additional concepts of the addressing scheme according to the present invention.
Figure 16B:
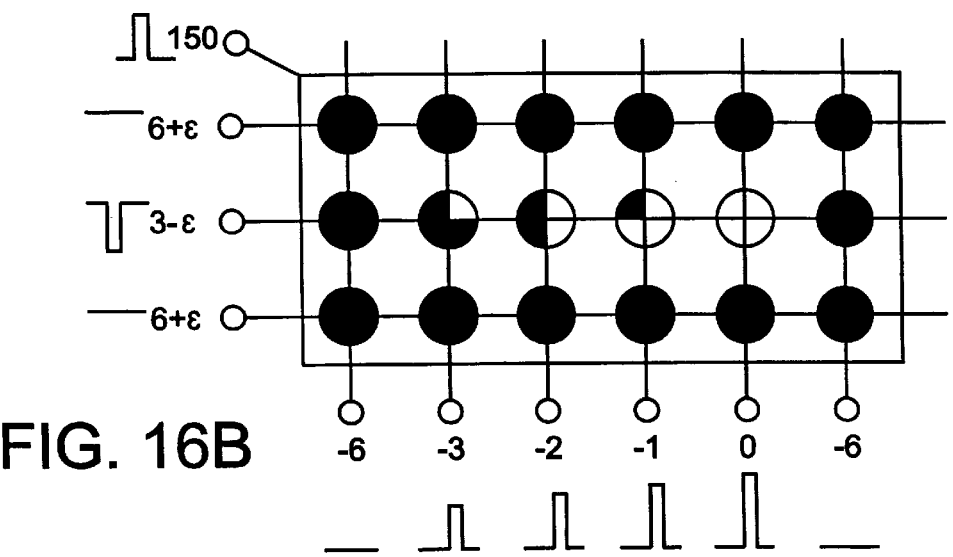
Figure 17:
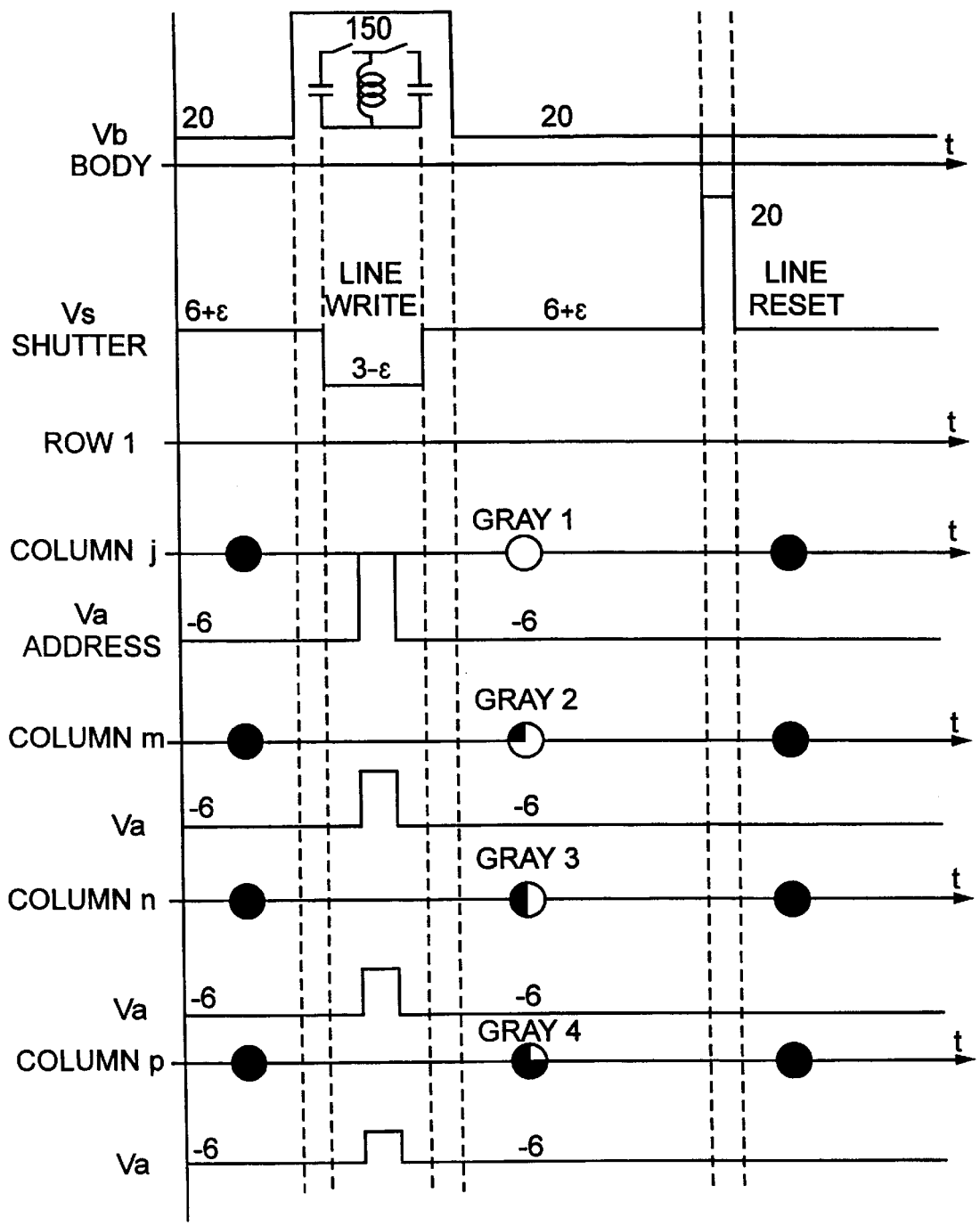
FIG. 17 is an illustration of signal lines according to the addressing schemes of FIGS. 16A–16F.

FIG. 16A shows a 3×6 array in a quiescent and dark state, all shutters horizontal (black). The bias voltage on the body is e.g. 20V, the rows (shutter segments) are held slightly below 6V, the columns (address electrodes) are held at −6V (note that all voltages can be shifted up to make everything unipolar, but the bipolar scheme seems to be clearer for explanation purposes).

When row2 needs to be addressed, the body is first brought to 150V bias and row2 is brought slightly below 3V. The grey levels are now written into the pixels of row2 depending on the column voltages. When a column is kept at its original −6V (with the row at 3−$\epsilon$), the difference between row and column is 3−$\epsilon$(−6)V, or approximately 9V. The hysteresis loop in FIG. 15C shows that the first shutter segment in a pixel only flips up at (Vs−Va)<6V. This pixel will therefore stay in its dark state (all segments horizontal, i.e. row2, column1 in FIG. 16B). On the other hand, if the column voltage is brought up to −3V (from −6V), (Vs−Va)= 6−$\epsilon$, with 5<6−$\epsilon$<6. This pixel (row2, column2 in FIG. 16B) will therefore have 1 of its 4 segments 'up' and the 3 others 'down' (i.e. grey level 1).

Analogous, row2/column3 will have 2 segments 'up' (Vs−Va=5$\epsilon$, grey 2), row2/column4, 3 segments 'up' (grey 2, Vs−Va=4−$\epsilon$) and the shutter assembly at column5 (address voltage 0V) will have all its shutter segments 'up' (bright state) Vs−Va=3−$\epsilon$) according to the hysteresis loop.

Figure 16C:
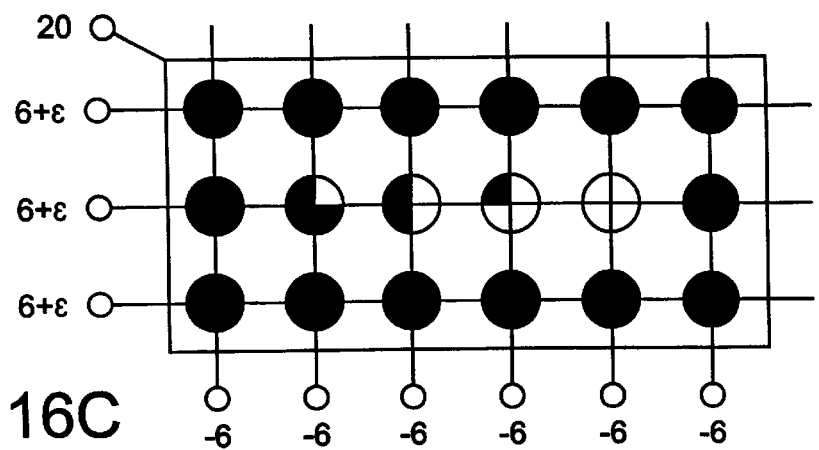

After the 'write' pulses on the row and on all the columns (see FIG. 17, time line), the bias voltage on the body can be brought back down to 20V. A holding voltage of 20V (possibly lower) is sufficient to keep all shutters in their addressed state. This is again a quiescent state (FIG. 16C). In first order, the only power consumption is due to leakage current.

The 150V pulses on the body can be accomplished with a switched LC circuit. This would allow for the recovery of charge on the body-to-shutter capacitances, rather than dissipating that charge. This charge is considerable because of the high voltage on the body. The main source of AC power consumption is associated with charging and discharging of this capacitor.

Figure 16D:
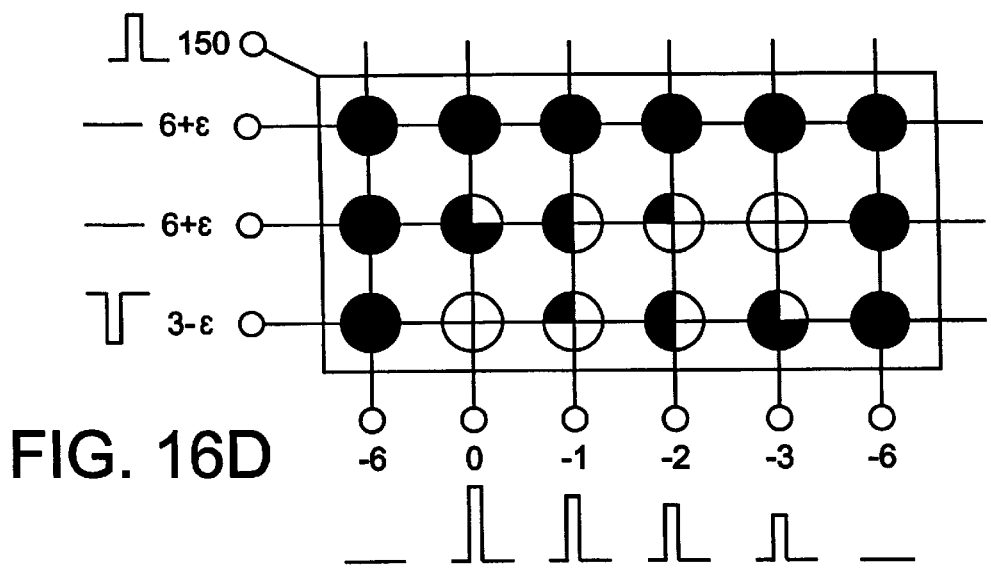
Figure 16E:
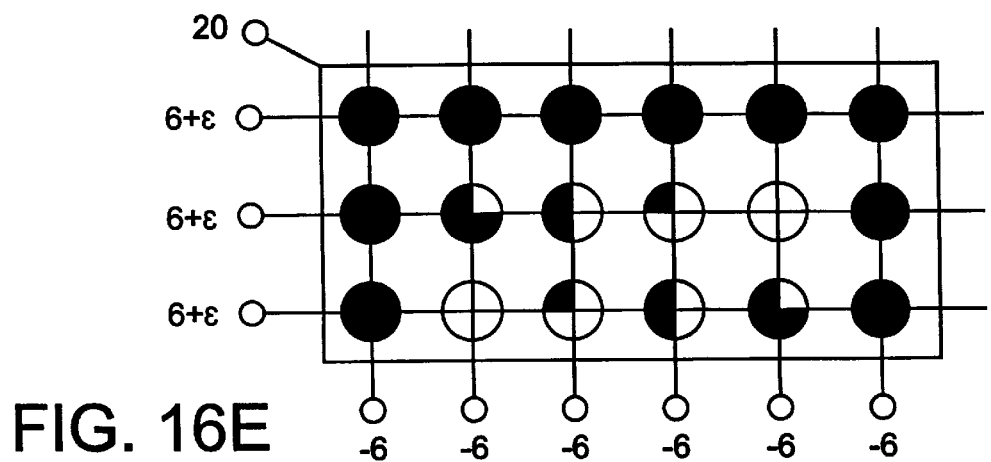

FIG. 16D shows another row (row3) being addressed in a similar way (a different bit pattern though). During addressing of row3, previously addressed row2 is unaffected because the row/column difference on all its pixels is more than 6V (i.e. more than required for the first segment of a pixel to flip up; see hysteresis loop). It is to be noted that in all rows other than the row being addressed at any particular time, 'down' segments stay 'down' and 'up' segments stay 'up'.

FIG. 16E is again a quiescent state, where the body is brought back to 20V after addressing of row3 and all rows are back at 6+$\epsilon$ and all columns at −6V.

Figure 16F:
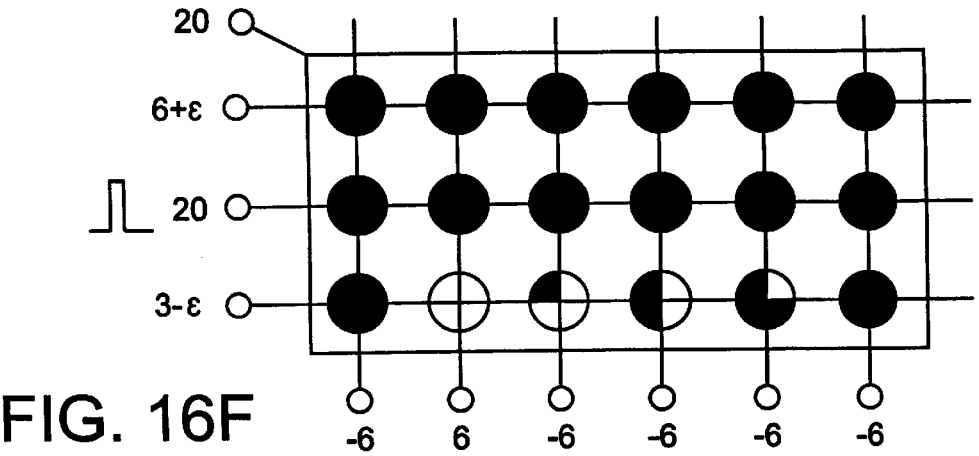

FIG. 16F and FIG. 17 finally show the reset of a particular row (row2). To selectively reset a row ('resetting' a row means bringing its 'up' segments back 'down'), the row voltage is pulsed to 20V (or even somewhat lower) while the body voltage is also at 20V. All other rows remain at 6+$\epsilon$ and all columns e.g. at −6V. Bringing the row to be reset to the same voltage as the body, discharges its sidewall/shutter capacitor and the restoring force of the torsion spring (plus voltage on the address capacitor, i.e. column) brings the shutter segments back to their horizontal position, i.e. the row is now reset.

Figure 18:
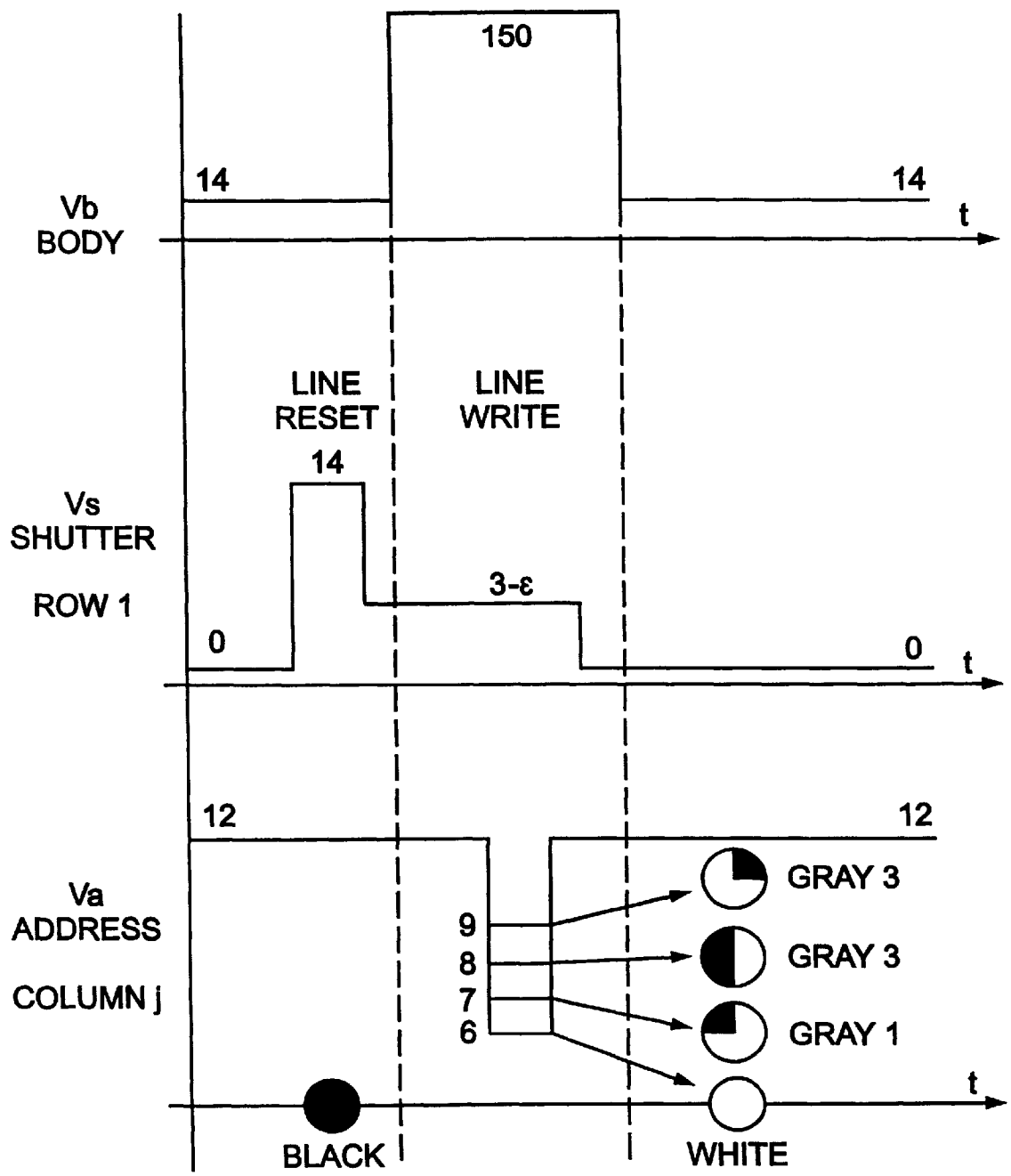
FIG. 18 shows signal lines for a further addressing scheme according to the present invention.

In practice, the scheme can be unipolar (by shifting everything 6V up) and the reset pulse could immediately be followed by the address voltage, etc . . . . Many variations on the theme are possible, the one most suited will be determined in the light of the driver circuitry or other parameters. A drive scheme attractive for practical implementation is shown in FIG. 18. It is a unipolar scheme where the reset pulse immediately precedes the write pulse (rows), where the body is kept at 14V in the quiescent state and momentarily brought to 150V during the write step. The quiescent voltage on the rows is 0V and 12V on the columns. During the addressing step, the row is brought up to 3−$\epsilon$V and the columns are brought down to 9V, 8V, 7V or 6V (grey scale values).

The connection between schemes shown in FIG. 17 and FIG. 18 is that the scheme in FIG. 18 can be derived from FIG. 17 by (1) shifting all row and column voltages down by 6V and (2) inverting all row and column address voltages (except the reset pulse). The various switching thresholds (see hysteresis loop of FIG. 15C) are defined by the difference between row and column voltages, and the shifting and inverting operations don't change these differences. The unipolar scheme therefore passes the test of FIG. 16A–16F (all possible combinations).

In any low voltage reset scheme (where the body is brought down before reset), recovering the charge associated with the 150V pulses on the body (with each row being addressed) seems quite important if we want to minimize power consumption. This seems feasible using a 'class E' switching regulator scheme. The static power consumption of the array is determined by leakage currents and by quiescent current in the driver circuits. The dynamic current (switching current) can be kept low by fully exploiting the bi-stability the shutter assembly, in addition to recovering the body switching charge. Full exploitation of bi-stability may require development of custom driver circuitry however.

d. Low Power

A virtue of the proposed display system is its bi-stability and hence the lack of DC power consumption, making it particularly suitable for battery powered, portable devices such as PDRs (Personal Document Reader). In the stable state, there is a holding field, but no current flow (except negligible leakage currents), i.e. a miniature battery can last practically indefinitely in this state. The consumption of power occurs only during pixel switching, i.e. due to charging/discharging of pixel capacitors. By far the largest charge is associated with charging the shutter-to-sidewall capacitance in the bright state (shutter vertical).

This capacitor is charged up to the bias voltage (e.g. 175), and the capacitance value is fairly large in the bright state because there is only a narrow gap between the shutter and the sidewall (which can be expressed as C=$\epsilon$ A/d). These capacitors are charged and discharged with every dark/bright and bright/dark transition over the entire pixel array. The power consumption is therefore proportional to the refresh rate and also to the shutter to sidewall capacitance, the area of the display and its fill factor and to the square of the bias voltage.

The power consumption was calculated for a few PDR scenarios and tabulated in Table 2, as well as the corresponding lifetime of a AAA-size alkaline battery (assumed 50 Whr/lb battery capacity). For a given display size and refresh rate, the power consumption can only be further reduced by lowering the bias voltage (Vb, quadratic effect; possible for lower resolution displays) or by decreasing the shutter-to-sidewall capacitance at $\ominus=90°$. The latter can be done by providing for a larger gap in the open state.

SCENARIO

3½×4½ VGA PDR Display, 216 Colors (6-segment hexagon bistable grey scale in a reflective mode)

TABLE 2

| Use: hours/days (10 continuous) | Pwr: AAA Battery | |
|---|---|---|
| Video: 40 Hz frame rate continuous, 10 hr/day, 7 days/week | 10 mW | 31 days |
| Web browsing: Hz frame rate months | 1.25 mW | 9 |
| Document reading: 1 Hz frame rate | 0.25 mW | 3 years |
| 13824 colors (+2 bit time domain grey): 32 Hz frame, 128 Hz pixel | 30 mW | 10 days |

Other ways to even further reduce power consumption can include event-driven frame refresh or use of other known addressing related schemes. One such operation would include recycling the switching charge on a capacitor instead of dissipating it with every frame reset. Even with the basic schemes however, power consumption in various scenarios can already be less than what could be produced by a solar cell with an area much smaller than the display itself.

f. Viewing Angle, Contrast Ratio.

Both contrast ratio and viewing angle have been found to be quite good, given the front sides of the shutters can be made black and all other surfaces reflective and given the fill factor of the pixels is high. For shutter assembly A' configured as shown in FIG. 8, the fill factor can be 90% (20:1 aspect ratio etch).

If the sidewalls of the pixel cavities and the back side of the shutters are reflective (FIG. 3), the cavities consist of multiple corner cube reflectors, which provide for high reflection efficiency. The sidewalls of an STS RIE etched silicon cavity are relatively flat and reflective, a thin A1 (300 Å) coat can easily bring the reflectivity well above 80% for all visible wavelengths. Also, the viewing angle will be very wide as the reflectivity of the sidewalls and shutter backsides is better than 80%.

g. Conclusion

The shutter assembly described above appears readily feasible in single crystal silicon with the current state of micromachining technology, e.g. for 2.5×3" PDR displays. The concepts are scalable to large area displays. The display arrays according to the present invention can also be fabricated using polysilicon on glass technology or plastic film lamination processing.

The foregoing is considered as illustrative only of the principles of the invention. further, since numerous modifications and changes will readily occur to those skilled in the art, it is not desired to limit the invention to the exact construction and operation shown and described and accordingly, all suitable modifications and equivalence may be resorted to falling within the scope of the invention.

In consideration thereof, we claim:

1. A micro-electromechanical shutter assembly comprising:

a transparent face plate layer provided to protect the shutter assembly from environmental effects;

a first conductive layer located below the transparent face plate, patterned with vertical sidewalls which define a cavity;

a second conductive layer located below the first conductive layer patterned in the shape of a shutter including shutter segments suspended by springs, the shutter formed near the bottom of the cavity;

a spacer layer located below the second conductive layer;

an electrically insulating bottom layer located below the spacer layer, whereby the spacer layer defines a gap between the second conductive layer and the bottom layer;

a third conductive layer located on the electrically insulating bottom layer;

an electrical terminal which provides a selectively actuated bias voltage to the sidewalls;

first address signal lines in operative connection with the shutter assembly, to provide selectively actuated first address signals to the shutter assembly; and second address signal lines in operative connection with the third conductive layer to provide selective actuated second address signals to the third conductive layer.

2. The micro-electromechanical shutter assembly according to claim 1 wherein the shutter is bistable.

3. The micro-electromechanical shutter assembly according to claim 1 wherein the bottom layer carries pixilated RGB color films.

4. The micro-electromechanical shutter assembly according to claim 1 wherein the sidewalls are optically reflective and coated with a thin insulating layer.

5. The micro-electromechanical shutter assembly according to claim 1 wherein the spring uses a folded beam structure.

6. The micro-electromechanical shutter assembly according to claim 1 wherein the shutter assembly is formed in single crystal silicon.

7. The micro-electromechanical shutter assembly according to claim 1 wherein the shutter assembly is configured by a lithographic process.

8. The micro-electromechanical shutter assembly according to claim 1 wherein the shutter assembly is formed as at least one of a square configuration with two or four shutter segments, a rectangular configuration with two or four shutter segments, and a hexagon configuration with six shutter segments.

9. The micro-electromechanical shutter assembly according to claim 1 wherein the shutter assembly is configured to receive the bias voltage when, the bias voltage is larger than a voltage supplied by the second address lines, and wherein the shutter assembly is further configured such that the smaller address voltage from the second address lines is sufficient to move a selected shutter segment from a first stable position to a second stable position when the larger bias voltage is being applied to the shutter assembly.

10. The micro-electromechanical shutter assembly according to claim 1 wherein the shutter segments are individually controllable from a first stable position to a second stable position.

11. A method of forming a micro-electromechanical shutter assembly comprising:

patterning a first conductive layer with vertical sidewalls which form a cavity;

patterning a second conductive layer located below the vertical sidewalls into the form of a shutter, the shutter having at least two shutter segments connected to a shutter body through springs which allow for movement of the segments;

forming a spacer layer below the second conductive layer;

providing an electrically insulating bottom layer below the spacer layer such that a gap is formed between the second conductive layer and the bottom layer;

forming an electrode terminal on the first conductive layer in order to supply a bias voltage, the bias voltage causing at least one of the shutter segments to move from a horizontal position at substantially 0 degrees to a vertical position at substantially 90 degrees; and forming addressing lines on at least one of the shutter and bottom layer to supply addressing signals, the addressing signals selectively causing at least one of the shutter segments in the vertical position at substantially 90 degrees to be moved to the horizontal position at substantially 0 degrees.

12. The method according to claim 11 further comprising configuring an array of shutter assemblies for use in at least one of a reflective, projection, and transflective display device.

13. The method according to claim 11 wherein the step of forming the shutter with moving segments allows for display of a grey scale image.

14. A shutter assembly array for use in a display device, the shutter assembly array comprising:

a plurality of shutter assemblies including,
  a transparent face plate layer provided to protect the shutter assemblies from environmental effects,
  a first conductive layer located below the transparent face plate, patterned with vertical sidewalls which define a cavity,
  a second conductive layer located below the first conductive layer patterned in the shape of a shutter including shutter segments suspended by springs, the shutter formed near the bottom of the cavity,
  a spacer layer located below the second conductive layer, and
  an electrically insulating bottom layer located below the spacer layer, whereby the spacer layer defines a gap between the second conductive layer and the bottom layer;

an electrical terminal which provides a selectively actuated bias voltage to each shutter assembly, wherein the first conductive layer of each shutter assembly is common to each other shutter assembly of the array;

row address lines connected to the shutters of each shutter assembly of the array, to provide row address signals to selected shutter assemblies of the array; and column address lines carried on the bottom layer of each shutter assembly of the array, to provide column address signals to selected shutter assemblies of the array.

15. The shutter assembly array according to claim 14 wherein the display device is one of a reflective, projection, and transreflective display.

16. The shutter assembly array according to claim 14 wherein the display device using the shutter assembly array displays grey scale images.

17. A micro-electromechanical shutter assembly display comprising:

a conductive cavity having substantially planar conductive sidewalls;

a plurality of shutter segments located within the cavity, the shutter segments being substantially perpendicular to the sidewalls when in a first position;

a conductive electrode film located below the shutter segments, in a position substantially parallel to the shutter segments in the first position;

wherein when no voltage is applied the sidewalls, shutter segments and the conductive electrode film of the shutter segments remain in the first position;

wherein when a critical bias voltage is applied between the sidewall and shutter segments the shutter segments are moved to a second position substantially parallel and into contact with the sidewalls; and wherein when the critical bias voltage is applied between the sidewall and shutter segments, and a critical segments voltage is applied to selected shutter segments, the selected shutter segments are maintained or moved to the first position, and the shutter segments which were not selected are maintained or moved to the second position.

18. The micro-electromechanical shutter assembly display according to claimed 17
  wherein the display is configured as an array of shutter assemblies for use in at least one of a reflective projection, and transflective display device and
  wherein when an image is displayed on one of the reflective and projection displays, the image is maintained through a step of maintaining a holding voltage, whereby a refresh current is not required and therefore substantially no power is being consumed while displaying an image whereby power consumption occurs substantially only during switching of images.

19. The method according to claim 17 wherein use of the array in one of the reflective, projection and transreflective display device results in a passive matrix type display.

20. The micro-electromechanical shutter assembly display according to claim 17, wherein at a certain segments voltage an address torque is larger than a bias torque at small angles, and a stable shutter position is consequently created at $\Theta=0$, and wherein said certain segments voltage for which this happens is substantially smaller than the bias voltage.

21. The micro-electromechanical shutter assembly display according to claim 17 wherein the shutter assembly display includes a plurality of shutter assemblies arranged and controlled to create an image upon application of predetermined bias and shutter voltages.

22. The micro-electromechanical shutter assembly display according to claim 17 wherein a holding voltage is used to maintain an image, without the requirement of a refreshing voltage, whereby there is substantially zero power consumption while an image is being displayed and substantially all power consumption is associated with the switching from one image to another.

23. The micro-electromechanical shutter assembly display according to claim 17 is a passive display.

24. The micro-electromechanical shutter assembly display according to claim 17 wherein the shutter assembly may be as small as several inches across to over 30 feet across.

* * * * *